United States Patent [19]

Maguire, Jr.

[11] Patent Number: 5,748,382

[45] Date of Patent: May 5, 1998

[54] SYSTEM FOR STRETCHING A SOLID FLEXIBLE LENS

[76] Inventor: Francis J. Maguire, Jr., 33 Colby Dr., East Hartford, Conn. 06108

[21] Appl. No.: 462,503

[22] Filed: Jun. 5, 1995

Related U.S. Application Data

[62] Division of Ser. No. 1,736, Jan. 7, 1993, Pat. No. 5,422,653.
[51] Int. Cl.$^6$ .............................. G02B 15/14; G02B 3/12
[52] U.S. Cl. ................................. 359/676; 359/666
[58] Field of Search .................................. 359/676, 666

[56] References Cited

U.S. PATENT DOCUMENTS

| | | | |
|---|---|---|---|
| 4,181,408 | 1/1980 | Senders | 351/159 |
| 4,300,818 | 11/1981 | Schachar | 351/41 |
| 4,303,394 | 12/1981 | Berke et al. | 434/40 |
| 4,348,186 | 9/1982 | Harvey et al. | 434/44 |
| 4,431,278 | 2/1984 | Nohda | 351/211 |
| 4,444,471 | 4/1984 | Ford, Jr. et al. | 359/666 |
| 4,828,381 | 5/1989 | Shindo | 351/211 |
| 5,245,371 | 9/1993 | Nagano et al. | 354/62 |
| 5,296,888 | 3/1994 | Yamada | 354/402 |
| 5,341,181 | 8/1994 | Godard | 351/210 |
| 5,394,517 | 2/1995 | Kalawsky | 395/129 |
| 5,423,215 | 6/1995 | Frankel | 73/386 |
| 5,455,654 | 10/1995 | Suzuki | 396/123 |
| 5,499,138 | 3/1996 | Iba | 359/569 |
| 5,526,183 | 6/1996 | Chen | 359/629 |
| 5,543,968 | 8/1996 | Freeman et al. | 359/631 |
| 5,555,039 | 9/1996 | Iki et al. | 351/205 |
| 5,561,537 | 10/1996 | Aritake et al. | 359/23 |

FOREIGN PATENT DOCUMENTS

| | | |
|---|---|---|
| 0655640 | 5/1995 | European Pat. Off. |
| 4215523 | 1/1993 | Germany . |
| 556924 | 3/1993 | Japan . |
| 5211625 | 8/1993 | Japan . |
| 2272124 | 5/1994 | United Kingdom . |

OTHER PUBLICATIONS

"Argos: A Display system for Augmenting Reality" by D. Drascic et al, Formal Video Programme and Proc. Conf. Human Factors in Computing Systems (Interchi '93), Apr. 24–29, 1993, Amsterdam, p. 521.

"Autocalibration for Virtual Environments Tracking hardware" by S. Gottschalk, et al, Computer Graphics Proceedings, Annual Conference Series, 1993, pp. 65–72.

(List continued on next page.)

*Primary Examiner*—Scott J. Sugarman

[57] ABSTRACT

A method and apparatus for providing, in response to image signals originating in an object space, mixed image signals for providing nonuniform resolution images for stimulating simulated active percepts for passive perception by a viewer in an image space. The images have a highly detailed component which has its image content changed according to changes in the direction of a simulated observer's eye position in an object space. The images may be provided stereoscopically. The images may be provided at various apparent distances and the relationship between accommodation and convergence may be preserved. Audio waves for directionally simulating that which would be heard by the simulated observer may be provided.

3 Claims, 23 Drawing Sheets

OTHER PUBLICATIONS

T. Caudell et al, "Augmented reality: An application of heads–up display technology to manual manufacturing processes", *Proc. Hawaii Int'l Conf. System Sciences*, pp. 659–669, Jan. 1992.

M. Deering, "High resolution virtual reality", *Computer Graphics (Proc. SIGGRAPH Conf.)*, vol. 26, No. 2, pp. 195–202, Jul. 1992.

M. Gleicher, et al, "Through–the lens camera control", *Computer Graphics* (Proc. SIGGRAPH Conf.), pp. 331–340, Chicago IL, Jul. 1992 vol. 26 No. 2.

P. Wellner, "Interacting with paper on the digital desk", *Comm. ACM*, vol. 36, No. 7, pp. 87–96, Jul. 1993.

A. Janin et al, "Calibration of head–mounted displays for augmented reality applications", *Proc. Virtual Reality Ann. Int'l Symp.* (VRAIS '93), pp. 246–255, Sep. 1993.

S. Feiner, et al, "Knowledge–based augmented reality", *Comm ACM*, vol. 36, No. 7, pp. 53–62, Jul. 1993.

P. Milgram et al, "Applications of augmented reality for human–robot communications", *Proc. IROS '93: Int'l Conf. Intelligent Robots and Systems*, pp. 1, 467–1, 472, Yokohama, Jul. 1993.

"Video See–through Design for Merging of Real and Virtual Environments", E.K. Edwards, et al, IEEE Virtual Reality Annual International Symposium, Sep. 18–22, 1993, Seattle, Wasington, pp. 223–233.

"Merging Virtual Objects with the Real World: Seeing Ultrasound Imagery within the patient" M. Bajura, et al Computer Graphics Proceedings, vol. 26, No. 2, Jul. 1992 pp. 203–210.

"High–Resolution Inserts in Wide–Angle Head–Mounted Stereoscopic Displays", E.M. Howlett, et al, SPIE vol. 1669 Stereoscopic Displays and Applications III (1992), pp. 193–203.

"Proposal for A Large Visual Field Display Employing Eye Tracking" H. Yamaguchi, et al., SPIE vol. 1194, Optics, Illumination, and Image Sensing for Machine Vision IV (1989) pp. 13–20.

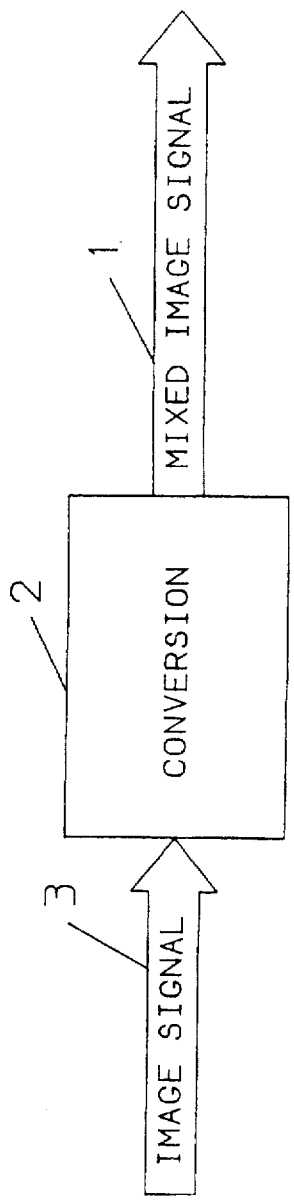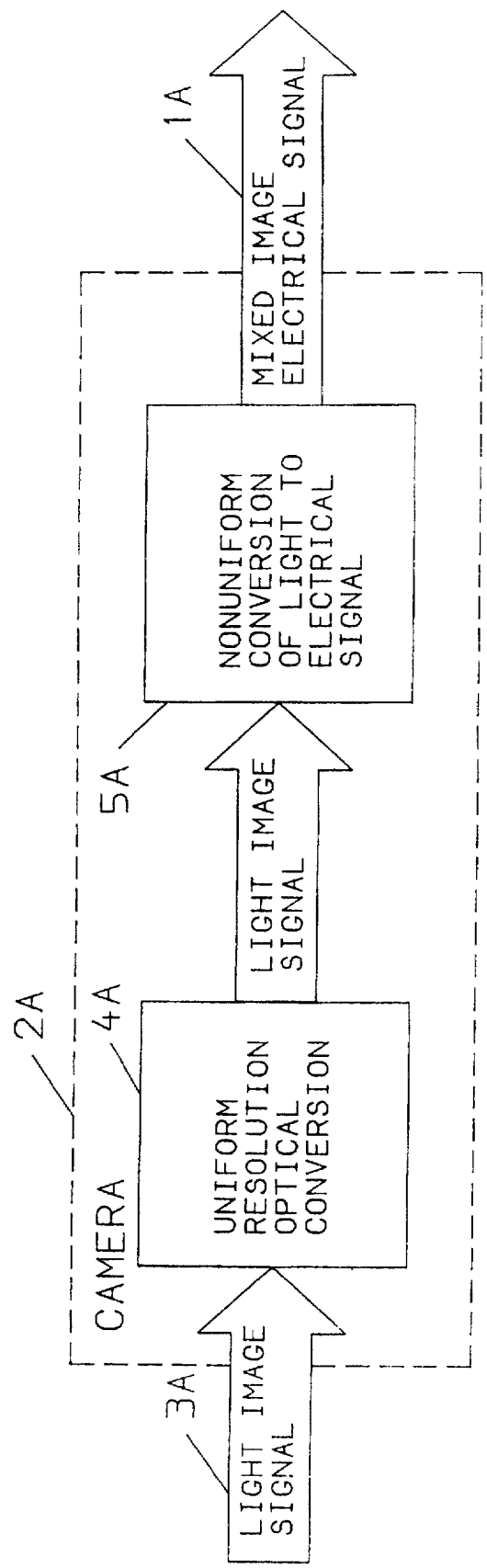

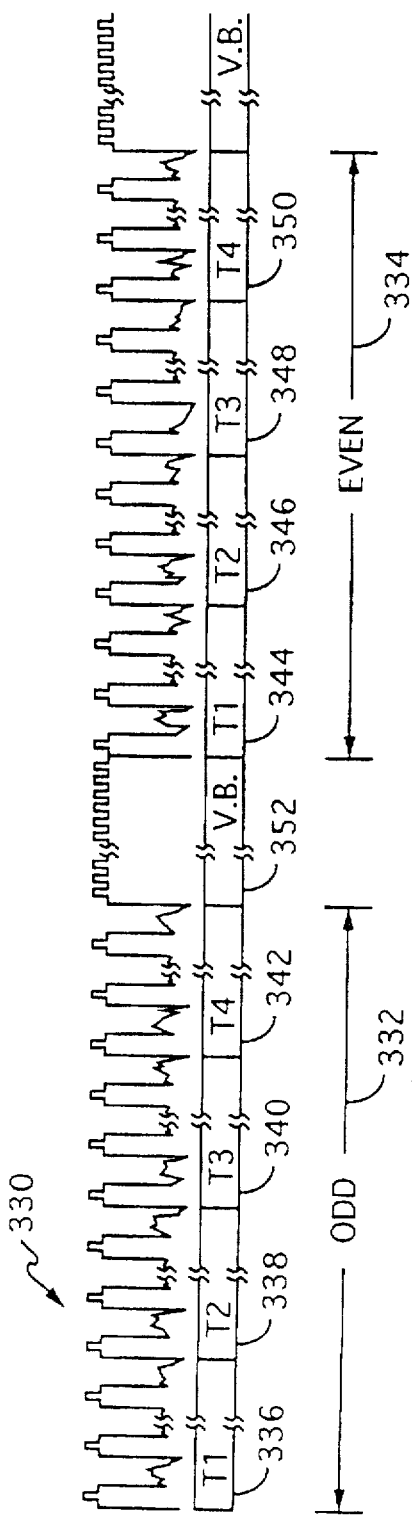
FIG. 14
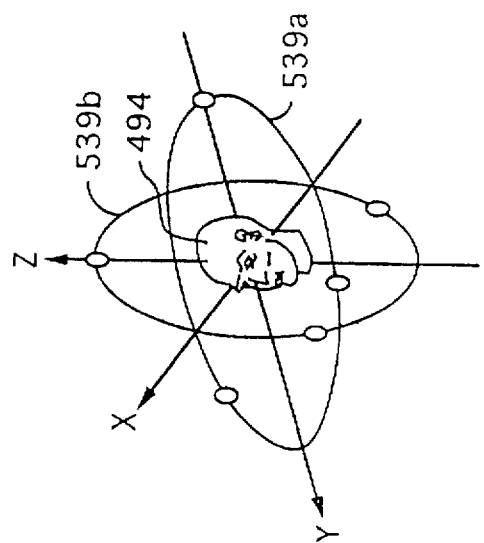
FIG. 13
FIG. 16a

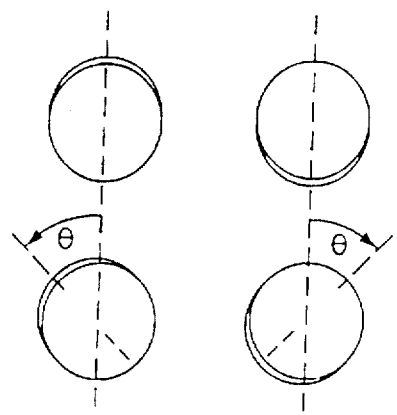
FIG. 21(a)
FIG. 21(b)
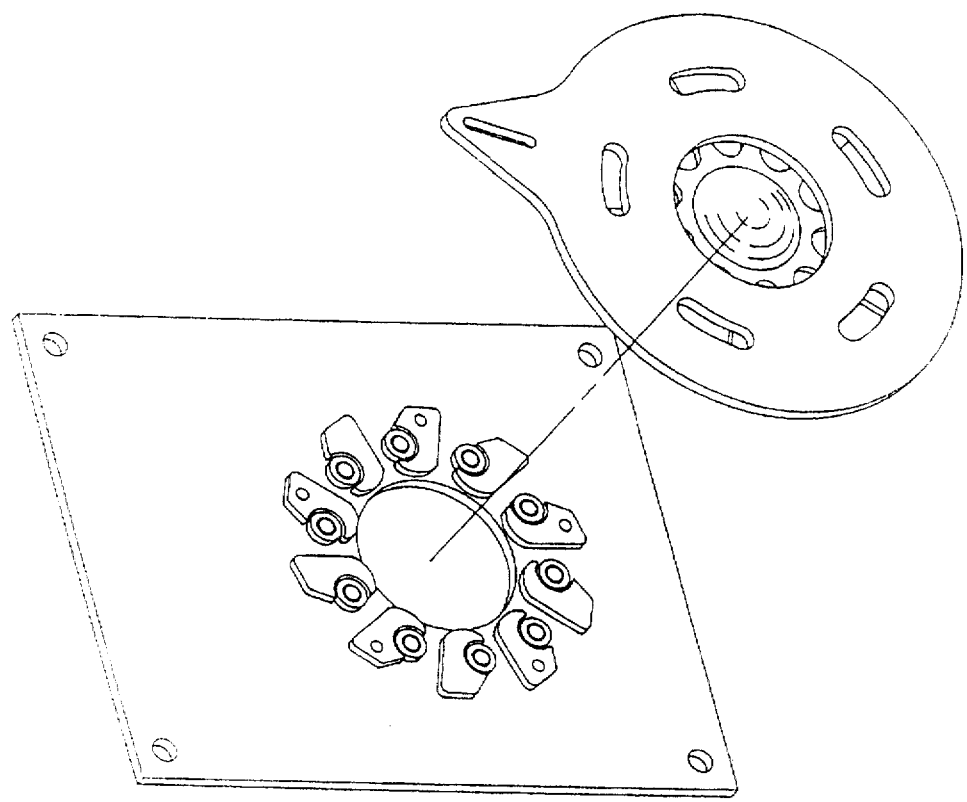
FIG. 33

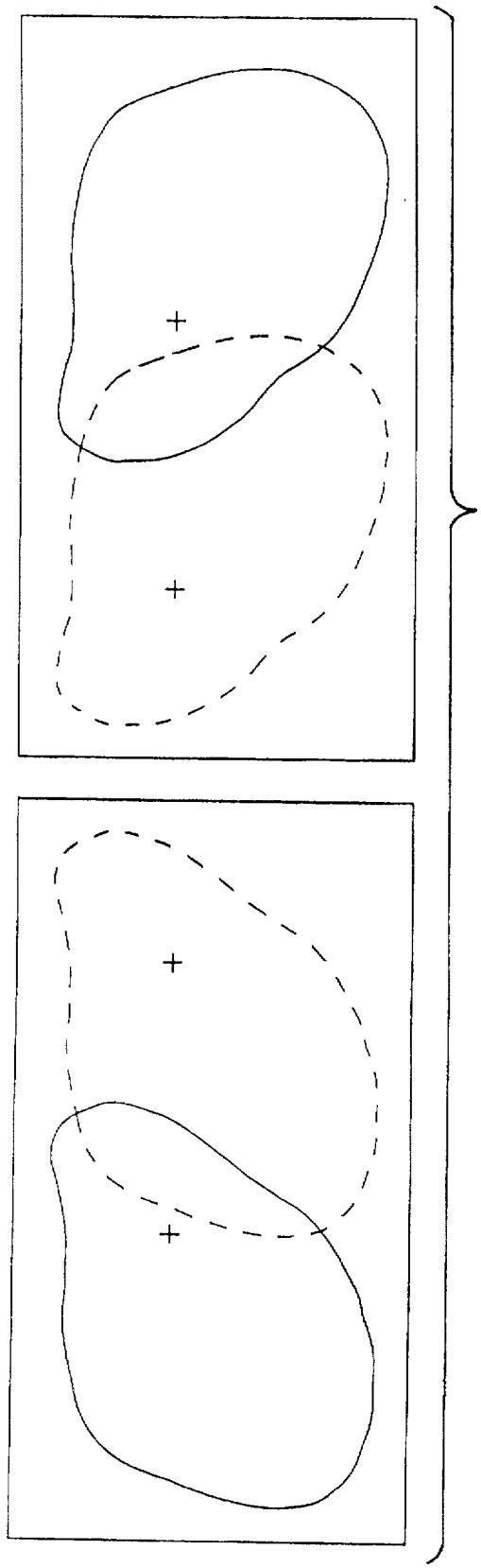
FIG. 22
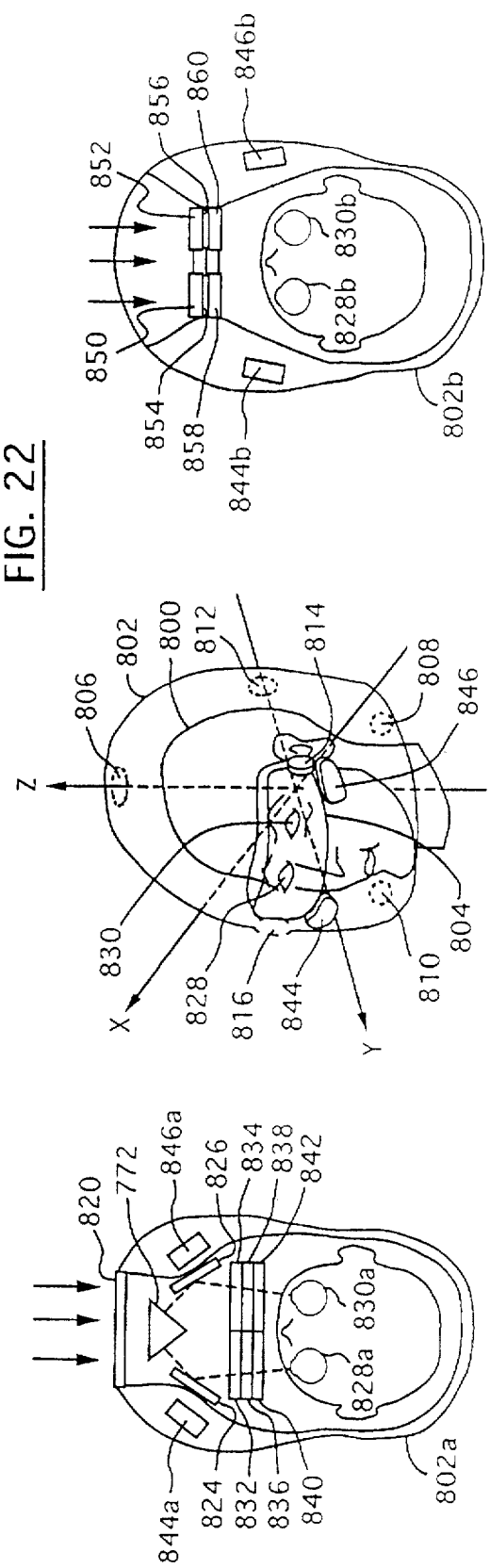
FIG. 25
FIG. 23
FIG. 24

5,748,382

SYSTEM FOR STRETCHING A SOLID FLEXIBLE LENS

This is a divisional of application Ser. No. 8/001,736 filed on Jan. 7, 1993 now U.S. Pat. No. 5,422,653.

TECHNICAL FIELD

The present invention relates to the presentation of images and, more particularly, to the presentation of successive images.

BACKGROUND ART

Still photography, motion pictures and television were influenced by the way artists represented physical reality in paintings, as if through a window. A highly detailed perspective image is provided, typically within a rectangular frame. All provide highly detailed images which induce the viewer to cooperate with the cameraman's "vision" by assuming the artificial perspective of the representation. The viewer is enabled to deliberately suspend disbelief that the images themselves are not a real object space. The degree to which the viewer is thus enabled is influenced not only by the image resolution but by the field of view. It is usually thought desirable to increase both. For example, very high resolution commercial television standards have been formulated for increasing image quality. Such approaches typically increase the number of horizontal lines scanned to a number significantly greater than present standards. Larger format movie film such as 70 mm has been used to increase detail. Also, panoramic movies, e.g., "Cinerama" increased the field of view to increase realism. Various stereoscopic television approaches have also been conceived or developed to increase realism.

All of these traditional media take a rather objective view of the physical world. The image is framed by a window through which the viewer can gaze in any direction "into" a representation of an object space. Events are presented in both movies and television in a series of different action scenes in a story line which the viewer can observe from a seemingly quasi-omniscient point of view. The viewer is led to take what appears to be a view of the world as it really is. Yet the choice of image and its perspective is picked by the creator of the image and the viewer actually assumes a passive role. "Virtual reality," in an electronic image context, goes even further in the direction of increased realism but enables the viewer to take a more active role in selecting the image and even the perspective. It means allowing a viewer's natural gestures, i.e., head and body movements, by means of a computer, to control the imaged surroundings, as if the viewer were seeing and even moving about in a real environment of seeing, hearing and touching. Due to the myriad of possible actions of the viewer, a corresponding multiplicity of virtual activities needs to be available for viewer choice. This would represent the ultimate in artificial experience.

But the creation of many possible scenarios for viewer selection creates a massive demand for electronic image storage space and there is also the problem of a disconcerting time lag between the viewer's action and the response of the imaging system. These problems make this emerging technology hard to achieve using presently available hardware.

And it would seem impossible to carry out such a heightened artificial experience using motion picture technology.

DISCLOSURE OF INVENTION

The object of the present invention is to provide a new method and means of presenting images in succession.

According to a first aspect of the present invention, images simulative of active percepts are provided for passive perception.

Simulated percepts, according to the present invention, permit a viewer to experience percepts as if inside the head of another person.

The simulated active percepts may be presented "live" or may be stored and retrieved from storage and presented for passive perception. In the case of stored simulated active percepts, since there is only one set of images to store, the memory problem of the prior art is solved. Similarly, for the "live" case, since the simulated active percept is provided as created there is no storage requirement at all. Moreover, by providing simulated active percepts for passive perception, there is no longer any time lag problem. Since the simulated active percepts induce the viewer to emulate those physical actions which would've created the simulated active percepts, the hardware need not be faster or as fast as the viewer. In fact, it may be much slower. Although the viewer is relegated to a rather passive role, the novelty and richness of the virtual reality experience more than compensates in opening a whole new world of opportunity for representing reality.

In further accord with this aspect of the present invention, the images simulative of active percepts are nonuniform images. The human visual apparatus does not resolve images uniformly, since the human eye's retina converts optical images cast upon it with nonuniform resolution. The portion of the image about the axis of the observer's gaze is cast on the *fovea centralis*, for high detail perception of the image information, while peripheral image areas are cast on the remainder of the retina for perception with less detail. Thus, there is a fundamental mismatch between the traditional manner of pictorially representing, with uniform resolution, the objects which constitute physical reality and the manner in which we actually sense it.

Although the visual apparatus senses the details of objects nonuniformly, human perception is of objects having uniform resolution. Such perception is formed by integrating a series of fixations over time. To complicate matters, any given observer's point of view within an object space is not generally kept stable at all. As the observer moves about with three translational degrees of freedom in the object space his head may continually be changing its orientation as permitted by its three rotational degrees of freedom. At the same time, the observer's eyes, with three rotational degrees of freedom of their own, are continually fixating on different objects within that space. There is no experience of disorientation because the observer senses that the object space is stable with respect to his head and eyes moving about under self-impetus. A sense of balance is lent by the mechanism of the inner ear. In addition, visual clues, including nasal and eye orbital shadows indicate the present orientation of the head with respect to that of the eyes and with respect to the object space.

In the case of paintings and still photography, the point of view is of course unchanging. But, even for movies and TV, a given point of view, once acquired, is kept rather stable and is generally changed only very slowly to avoid viewer disorientation. Most have experienced some discomfort when viewing a stable movie or TV image which is suddenly moved quickly in a lateral direction or which suddenly tilts from its normally horizontal orientation. This effect is due to the upset of a stable, uniform image of an object space which purports to represent or substitute for physical reality. To upset the frame is akin, according to the perception of the viewer, to upsetting the object space itself. Hence, the discomfort.

Thus, there is also a fundamental mismatch between the traditional technique of static or quasi-static image presentation used in the movie and consumer TV media, described above, and the manner in which images are actually gathered and experienced by an observer using his human visual apparatus. I.e., where the observer may quickly move about in an object space, in a process of frequently changing his point of view and his gaze in order to acquire visual information from all directions concerning his surroundings.

In keeping with these teachings, in further accord with the first aspect of the present invention, images are presented to simulate movement of the observer's eye's orbital shadow, i.e., the overall direction of view with respect to the object space for stimulating the passive viewer to execute analogous head movements.

In further keeping with these teachings, in still further accord with the first aspect of the present invention, nonuniform resolution images are presented which simulate ductions of a simulated eye with respect to the simulated eye's orbit for stimulating a passive viewer's eye to execute analogous ductions and which may, at the same time, or independently, simulate movement of the orbital shadow, i.e., the point or field of view with respect to the object space, for stimulating the passive viewer to execute analogous head movements.

In further accord with this first aspect of the present invention, successive mixed optical images of an object space are provided in an image space for a viewer's eye or for the viewer's visual apparatus, each mixed optical image having a highly detailed component and a lesser detailed component; the image content of selected successive mixed optical images being changed according to changes in the direction of the simulated eye's visual axis in the object space; the highly detailed component for being cast on the fovea of the retina of at least one of the viewer's eyes and the lesser detailed component for being cast on a nonfoveal part of the retina of one or the other (not necessarily the same one that the highly detailed component is cast on) of the viewer's eyes such that the relative direction of the visual axis of at least one of the viewer's eyes with respect to the image space may analogously follow the relative direction of the simulated eye's visual axis with respect to the object space. The mixed images may be made in any number of different ways. For example, one or both eyes may be presented with mixed images made up of one or more wide field of view fields or frames of low detail followed at a selected point in time by one or more high detail fields or frames over a narrow field of view. Or, one eye may be presented with only narrow field of view high detail images while the other is presented with only low detail images covering a wide field of view. The manner of constructing and unifying the mixed images into a coherent presentation presents the designer with almost limitless possibilities and variations. In such a case it is difficult to describe all possible future implementations of the claimed method and apparatus or all ways of constructing "mixed images." Even though it is difficult or even impossible to describe all such variations, an attempt is made in this disclosure to briefly describe several such variations in order to show the breadth of possible approaches and that therefore all such variations, elaborations, take-offs, interpretations, etc., of the teachings hereof, and which are fairly within the scope of the claims, are covered thereby. As a consequence, according to the present invention, whatever the method selected for constructing "mixed images," at least one of the foveae of a viewer may be stimulated by high detail images having a narrow field of view and at least one of the retinae of the viewer may be stimulated by low detail images having a wide field of view, the total effect being unified perception of nonuniform resolution images. of course, the simplest approach is to present both a highly detailed image and a lesser detailed image to one or both eyes. Another simplification is to limit the number of degrees of freedom represented, e.g., by only simulating two of the three degrees of rotational freedom of the eye, i.e., by omitting the simulation of torsion. Of course, only one degree of freedom, e.g., horizontal, may be acceptable for many purposes. Or, the translational or head movement degrees of freedom could be limited or even omitted in some approaches.

In still further accord with this first aspect of the present invention, the highly detailed component is mobile with respect to the lesser detailed component to simulate ductions of the simulated eye with respect to the simulated eye's orbit, the lesser detailed component encompassing a field of view which changes to simulate movement of the orbit's head with respect to the object space. In other words, the highly detailed component moves about to simulate at least two of the rotational degrees of freedom of the eye (ductions) while the lesser detailed component changes its point of view to simulate the rotational degrees of freedom of the head. Simulation of translational degrees of freedom is provided by translating the point of view of the lesser detailed component.

Alternatively, the highly detailed component is immobile with respect to the lesser detailed component wherein the highly and lesser detailed components are jointly mobile to simulate eye ductions with respect to the simulated eye's orbit. In that case, the lesser detailed component of the successive mixed optical images encompasses a field of view which changes to simulate the simulated eye's ductions with respect to the orbit's head and which also changes to simulate movement of the head with respect to the object space. This alternative may be effectively carried out in a real object space, e.g., by mounting a camera having a nonlinear lens (such as disclosed in U.S. Pat. No. 3,953,111) on a two degree of freedom platform for simulating two of the three degrees of freedom of the eye in its socket (omitting torsions) and mounting the platform on another platform having three rotational degrees of freedom, e.g., a cameraman's head.

In still further accord with this first aspect of the present invention, the successive mixed optical images are provided for panoramic presentation to a viewer's eye.

In still further accord with this first aspect of the present invention, the successive mixed optical images are provided at various apparent distances such that a viewer's eye may accommodate to focus on the successive mixed optical images at the various apparent distances.

In still further accord with this first aspect of the present invention, the various apparent distances are selected in such a way as to preserve a normal relationship between accommodation and distance.

It should be understood that the provision of mixed images for perception by a passive viewer, according to the first aspect of the present invention, separately encompasses the two fundamental processes (and the separate and distinct means for carrying them out) normally associated with the commercial exploitation of motion picture and television productions. I.e., the unitarily claimed invention covers either and both the creation or presentation of images:

(i) in response to an image signal, e.g., and without limitation, an optical image of an actual object space, the creation of successive mixed image signals for immediate presentation or for storage for later retrieval, and (ii) in response to an image signal, e.g., to retrieved mixed image signals of the type provided "live" or stored as described in (i) above, the presentation of mixed optical images for presentation to a passive viewer.

This further teaching of the first aspect of the present invention may be stated as the provision of mixed image signals,which may be electrical, optical, or generally electromagnetic, in response to an image signal which may or may not be mixed and which may also be generally electromagnetic of any type.

According to a second aspect of the present invention, additional successive mixed optical images of the object space are presented in the image space for presentation to the viewer's visual apparatus, each additional mixed optical image having a highly detailed component and a lesser detailed component, the image content of selected additional successive mixed optical images being changed according to changes in the direction of an additional simulated eye's visual axis in the object space; the highly detailed component for being cast on the fovea of the retina of at least one of the viewer's eyes and the lesser detailed component for being cast on the retina of at least one of the viewer's eyes such that the relative direction of the visual axis of at least one of the viewer's eyes with respect to the image space may analogously follow the relative direction of the additional simulated eye's visual axis with respect to the object space. The stimulation of a viewer's eyes with images from different perspectives produces stereopsis. Again, the mixed images may be constructed in any number of different ways. For example, a small, highly detailed image from one perspective might be presented to one eye for its fovea and a large, lesser detailed image might be presented from another perspective to the other eye for its retina. Or, each eye may be presented with both highly and lesser detailed image areas from different perspectives, i.e., both the highly and lesser detailed image areas in each eye being from the same perspective. Or, only one eye may be provided with both highly and lesser detailed image areas, with the other having only a lesser or highly detailed image area presented to it. Other combinations are of course possible, and well within the scope of the present invention. And it should also be understood that not only may the method of constructing the binocular images be selected from a wide variety of different approaches, but also the manner of constructing the individual images or image portions may also be selected from a wide variety of different approaches. To take but a single simple example, for the case where both highly detailed and lesser detailed images are presented from different perspectives to each eye separately, the lesser detailed image presented to the left eye from a left perspective, and similarly to the right eye from a right perspective, are constructed from a horizontal scanning scheme similar to that used in conventional commercial television in which two separate "fields" are interlaced to form a single "frame" except that a small void may be left unscanned for fill-in by a high detail scan, also taken from the appropriate left and right perspectives. Each void may be filled in by the high detail scan subsequent to each of the field scans. However, it will be understood that, using such an approach, it could be filled in concurrently thereto, or subsequent to the frame, or even subsequent to a field or frame for the other eye. Needless to say, a great many other approaches may be practicable and be well within the scope of the present invention which fairly covers all approaches to the construction of mixed images constructed for passive viewing in furtherance of the object of the present invention.

In still further accord with this second aspect of the present invention, the successive mixed optical images and the additional successive mixed optical images are presented at various apparent distances such that the viewer's eyes may accommodate to focus on the mixed successive images and the additional successive images at the various apparent distances, passive viewer versions about the image space at the various apparent distances are thereby induced.

In still further accord with this second aspect of the present invention, the various apparent distances are selected so as to preserve a normal relationship between accommodation and convergence for the viewer. In this way, the viewer's induced passive versions at the various depths within the image space correspond closely to active versions by which the viewer would normally acquire visual information in real object spaces.

In still further accord with this second aspect of the present invention, the successive mixed optical images are provided from at least one image source for presentation to at least one of the viewer's eyes and wherein the additional successive mixed optical images are provided from at least another image source for presentation to at least one of the viewer's eyes.

Alternatively, in still further accord with this second aspect of the present invention, the successive mixed optical images and the additional successive mixed optical images are provided from a single image source and wherein the successive mixed optical images are for presentation to at least one of the viewer's eyes and wherein the additional successive mixed optical images are for presentation to at least one of the observer's eyes.

According to a third aspect of the present invention, audio waves are provided from a plurality of sources for the passive viewer for simulating audio waves which might be experienced by a pair of simulated ears located on opposite sides of the simulated eyes' head. One approach is to provide two or more speakers equally spaced about a horizontal equator around the passive viewer's head and to provide two or more additional speakers, equally spaced about a vertical equator at right angles to the horizontal equator. In this way, sounds may be simulated coming from any direction by varying the intensity of the sound waves produced by the various speakers.

The present invention provides a new approach to the presentation of successive mixed optical images of an object space to a passive viewer in an image space. passive perception of simulated active percepts seemingly puts the viewer inside the head of another person. The further approach of providing mixed images having highly detailed and lesser detailed components is for inducing a more subjective "reperception" of the simulated active percepts albeit passively. A few words about the meanings of some of the more important words used herein are in order at this point.

The words "object space" mean a real or imaginary space represented by successive images.

The word "observer" means a real or hypothetical person in an object space.

The word "viewer" means a real person in an image space.

The words "image space" mean a space used to provide images.

By "percept" is meant a real or hypothetical visual impression in a respective real or hypothetical visual apparatus.

A "active percept" refers to a percept attributable to body, head or eye movements of an observer.

The words "simulated active percept" denote an image for stimulating a passive viewer's visual apparatus.

The words "visual apparatus" are used to mean one or both eyes, optic nerves, tracts, cerebral cortex or associated parts thereof in any combination.

A "passive viewer" means one whose body, head or visual axis may analogously follow the body, head or visual axis of an observer by following simulated active percepts.

The words "active viewer" are meant to describe one whose activity or the effects thereof are monitored to provide a control signal which affects the information content of an image presented thereto. For example, in a remote viewing invention disclosed by Holmes in U.S. Pat. 3,507,988, a viewer provides the impetus for eye movements and by monitoring the viewer's eye, the scanning of a remote camera may be controlled according to the viewer's eye movements.

A "mixed image" comprises one or more images of simulated active percepts having areas of greater and lesser resolution together being simulative of foveal resolution. For example, such may comprise both highly detailed and lesser detailed portions or, alternatively, in the sense that individual images may individually be of uniform but different resolutions, i.e., may be either highly or lesser detailed, but together such images may be interleaved in some convenient manner, not necessarily alternately, to form a series of images which have the same effect as a series of images with different resolutions in each.

The words "image signal" means an electromagnetic manifestation, which may be conditioned or not, of an object space.

A "mixed" image signal is an image signal conditioned so as to produce a mixed image.

A "virtual eye" means an eye of a theoretical visual apparatus located in an object space. Although a cameraman whose eye or eyes are monitored for controlling the scanning of a camera or pair of helmet mounted cameras mounted on his head, according to one embodiment of the present invention, might, in combination and in essence, approximate the intended definition, the meaning is slightly more precise. In such a context, the cameraman's monitored eye is not in the same exact position as the camera's "eye," i.e., optics and light sensitive surface so there is a parallax problem. So the theoretical visual apparatus in that context is somewhere in between. In that situation, for example, the defined words mean the theoretical visual apparatus that would, if real and located in the object space, stimulate essentially the same percepts simulated in the image space by way of optical images presented to a passive viewer. For simulated active percepts made by computer or animation the meaning is similar.

The present invention thus provides a new method and means of presenting images of an object space for viewing by a passive viewer as if through the eyes of an active observer actively looking about within such an object space. Stated another way, the present invention teaches the presentation of images simulative of percepts of optical images of an object space as if cast on an active simulated eye's retina for stimulating similar percepts in a passive viewer. Stated negatively, the teachings of the present invention show not how to represent an object space for active perception, but how to present images simulative of active percepts of an object space for passive perception.

Thus, the present invention is distinguished from the accepted and time honored approach in the present state of the art of passive viewing, in which the object is to objectively portray an object space or, more recently, to improve the objective realism of the object space (without changing the basic approach) by increasing the field of view and improving image resolution. The present invention, on the contrary, teaches the depiction of a real or simulated observer's subjective experience of an object space for "reexperience" or "reperception" by an actual, but passive viewer. Increased realism in the usual sense is eschewed but, paradoxically, the effect in the passive viewer is an increased sense of reality, as experienced through the "eyes" of "another." Thus, the present invention provides a new way of passive, not active, viewing.

The state of the art approach to motion picture and television productions is to provide a view of reality through a quasi-omniscient "eye" which purports to see things as they are in themselves, while the approach of the present invention is to provide a new way of looking at things, as seen by a selected observer.

Moreover, the approach for presenting images, according to the present invention is, in effect, backwards, upside down and the reverse of the new technology of virtual reality. A passive viewer, according to the present invention, follows simulated active percepts.

The present invention may be used in a wide variety of applications including entertainment, education and others in which passive viewing is appropriate. The manner of presentation is so realistic and such a radical departure from present approaches that viewers are better able to suspend disbelief that the images are not real. In fact, viewers actually perceive an object space by way of simulation of the human visual process, as if through the eyes of another person. The traditional approach of placing the passive viewer in the position of an objective, quasi-omniscient observer is thus replaced by placing him in the position of "reperceiving" the perceptions of a subjective observer.

The simulated active percepts may be presented to a screen for viewing by one or more passive viewers at once such as is shown in U.S. Pat. 4,515,450 & 4,427,274 or PCT Patent WO 86/01310 in conjunction with, e.g., a pair of light shutter or polarizer glasses such as shown in U.S. Pat. No. 4,424,529, or may be provided via image sources in a helmet for mounting on a passive viewer's head in an approach suggested by U.S. Pat. Nos. 4,636,866, or 4,310,849, or many other possible presentation approaches.

These and other objects, features and advantages of the present invention will become more apparent in light of a detailed description of a best mode embodiment thereof which follows, as illustrated in the accompanying drawing.

BRIEF DESCRIPTION OF THE DRAWING

FIG. 1 shows conversion of an image signal to a mixed image signal, according to the present invention;

FIG. 1A shows a camera embodiment of the present invention wherein uniform resolution optical images are electronically converted to nonuniformly resolved electrical signals;

FIG. 13 shows the relation between FIGS. 13(b) and 13(c) and between 13(d) and 13(e);

FIG. 14 is an illustration of a composite video waveform such as may, without limitation, be provided by the camera of FIG. 1A or 1B, according to the present invention;

FIG. 16(a) is an illustration of a means and method of providing multiphonic sound from various directions to a passive viewer, according to the present invention;

FIG. 21 is an illustration of a Risley prism as may be used, according to the present invention;

FIG. 22 is an illustration of FIG. 18(c) & 18(d) except showing oversized matrices, according to the present invention;

FIG. 23 is an illustration of a helmet embodiment of the present invention for use in an image space by a passive viewer;

FIG. 24 is a top view of the helmet of FIG. 23; and

FIG. 25 is an alternate top view of the helmet of FIG. 23.

FIGS. 26–35 are illustrations of a variable magnification lens, according to the present invention;

BEST MODE FOR CARRYING OUT THE INVENTION

Figure 1B:
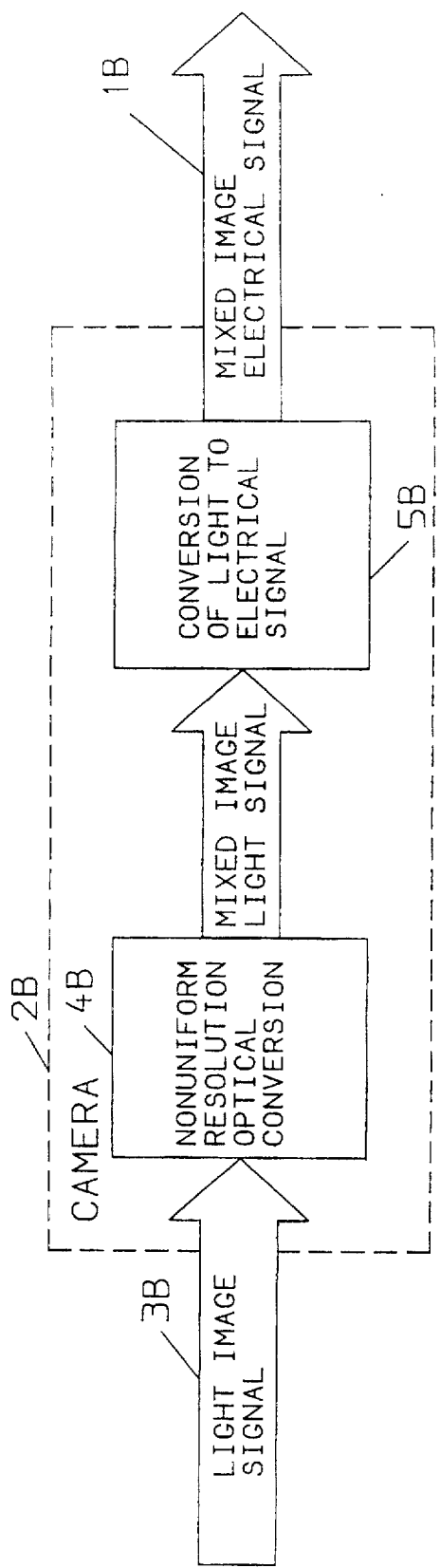
FIG. 1B shows another camera embodiment of the present invention wherein nonuniform resolution optical images are converted to similarly nonuniformly resolved electrical signals.
Figure 1C:
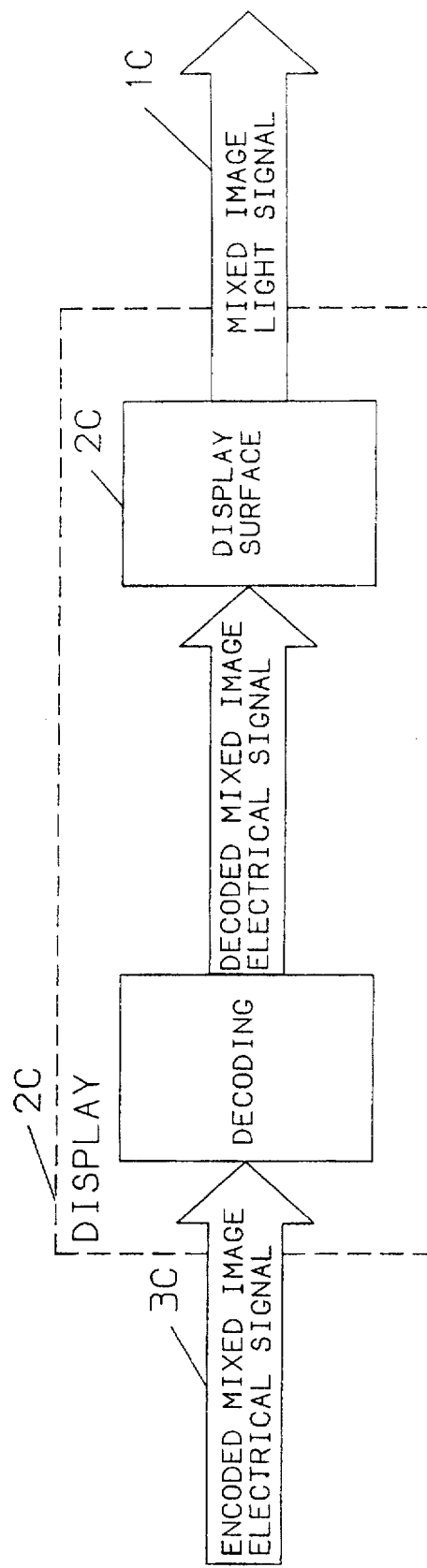
FIG. 1C shows a display embodiment of the present invention wherein a mixed image electrical signal, as provided by a camera embodiment of the present invention as in FIGS. 1 or 2, for presentation of simulated percepts according to the present invention.

FIG. 1 shows a mixed image signal on a line 1 provided after a conversion step or device 2, in response to an image signal 3 which may itself be a mixed image signal. Image capture methods and embodiments of the present invention are shown in FIGS. 1A and 1B and an image presentation or display method and embodiment is shown in FIG. 1C. In the practice of the invention as illustrated in FIGS. 1A & 1B, an apparatus or step 2A and 2B are similar to the device or step 2 of FIG. 1. These steps or embodiments 2A, 2B may include uniform resolution optical conversion or optics 4A or nonuniform resolution conversion or optics 4B and, in addition, a light sensitive surface 5A and 5B, altogether in an object space; the image signal 3 may be an optical image or light signal 3A, 3B provided to a light sensitive surface in the camera. The light sensitive surface is analogous to a retina of an observer in the object space. The light sensitive surface in the camera may be used to convert a uniform resolution light image signal to an encoded image signal of nonuniform resolution as in FIG. 1A. Or, it may be used to convert a nonuniform resolution light image signal to an encoded image signal of similar nonuniform resolution as in FIG. 1B. In either event, for the camera embodiments, the mixed image signal from the light sensitive surface is an encoded nonuniform resolution or "mixed" resolution image signal. It would, but need not, typically take the form of an electrical signal having the mixed images encoded therein. There could of course instead be an optical to optical signal conversion but the present state of the art is not yet at that stage. In a display embodiment of the invention as shown in FIG. 1C, the conversion step or device 2 may be carried out by or be itself a light emissive surface 2C in an image space and the image signal may typically, but need not, be an electrical mixed image signal similar to, or the same as, that provided by the camera embodiment. Again, of course, there may be an optical to optical conversion instead. The display embodiment is for providing, in response to such a mixed image signal, an optical mixed image signal which is an actual light image for stimulating simulated percepts in a viewer's eye, according to the present invention, wherein a viewer may virtually experience visual reality, as if in the object space and inside the observer's head, passively following the activity of the observer's visual apparatus.

Figure 2:
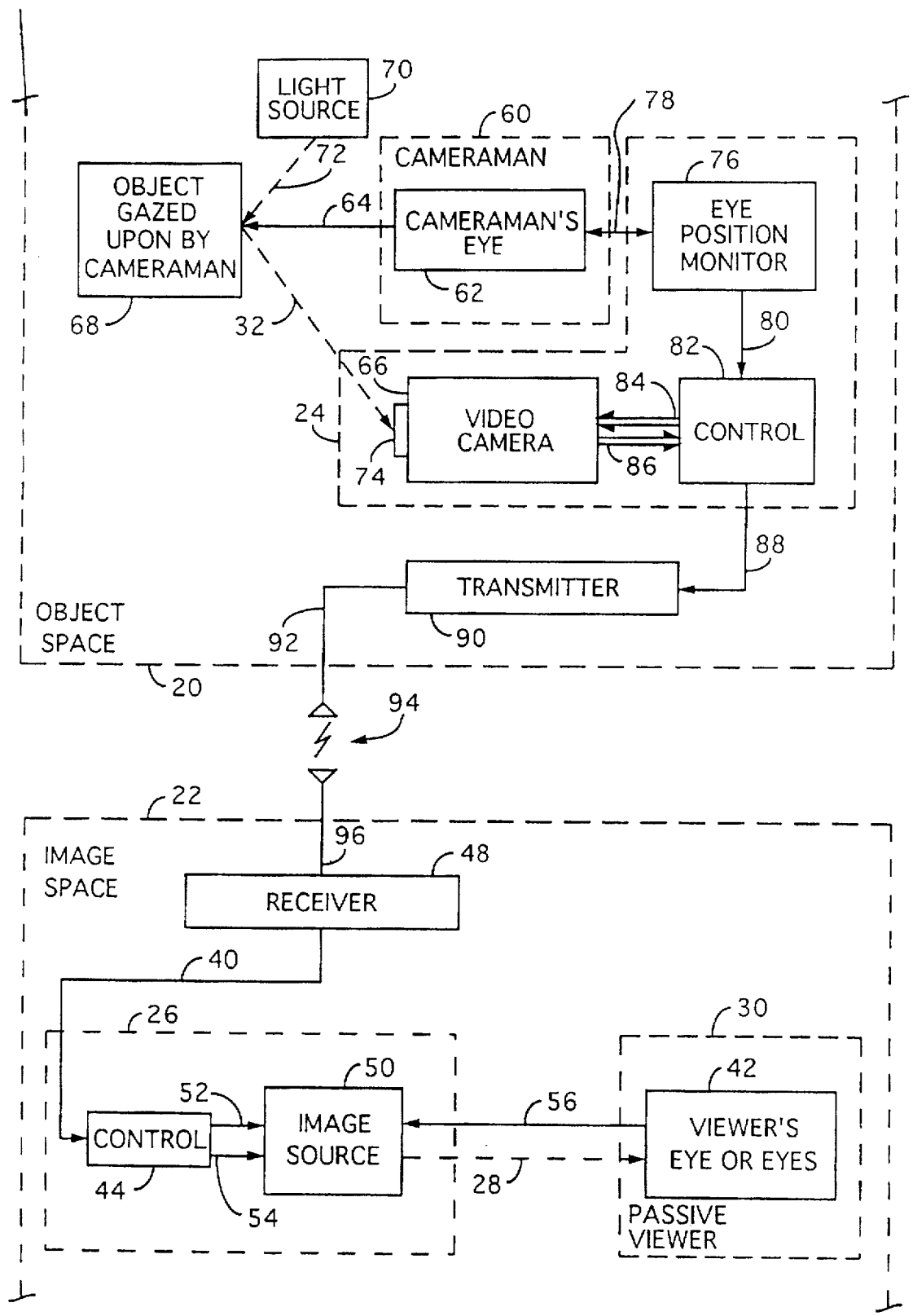
FIG. 2 is an illustration of an object space and of an image space, both the object space and the image space containing an apparatus, according to the present invention.

FIG. 2 is an illustration of an object space 20 and of an image space 22 respectively containing an apparatus 24 and an apparatus 26, each according to the present invention. The apparatus 24 is located in the object space and is responsive to image signals, e.g., reflected from objects in the object space and provides mixed image signals for transmission to a storage medium or, as shown without limitation, directly to the image space. The apparatus 26 is located for use in the image space 22 and is responsive to mixed image signals from the storage medium or, as shown, directly from the apparatus 24 in the object space for providing successive mixed optical images, also called mixed image signals, as indicated by an image signal on a line 28, to a passive viewer 30. As previously defined, "image signal" can mean any electromagnetic manifestation, whether conditioned or not and thus may encompass mere light rays reflected from objects such as the image signal on line 32 of FIG. 2, as well as conditioned electromagnetic manifestations such as the image signals on lines 34, 36, 38, 40, or 42. Additionally, the image signal on line 28 need not be provided directly, as shown, but may be reflected from a surface or may be transmitted through a medium. As defined above in the disclosure of invention section, and as explained in more detail below, the mixed optical image signals have highly detailed and lesser detailed components mixed together. The highly detailed component is designed to be cast on the fovea of a passive viewer's eye 42 and the lesser detailed component on the remainder of the passive viewer's retina. The mixing of highly detailed and lesser detailed image components lends a certain directionality to the images presented which induces the passive viewer to shift his gaze according to changes in the position of the highly detailed component with respect to the object space imaged or, alternatively, with respect to the lesser detailed component.

The apparatus 26 of FIG. 2 comprises a control 44, responsive to a video signal on a line 40 from a receiver 48, for decoding image information from the video signal and providing the image information in a signal format suitable for presentation by an image display or source 50, as indicated by a signal line 52. A control signal on a line 54 changes the portion of the object space represented in detail at any given time, i. e., changes the image content of selected successive images and hence the position of the highly detailed component with respect to the lesser detailed component or, alternatively, with respect to the apparent position of the object space imaged by the lesser detailed component, according to changes in the direction of a simulated active eye's visual axis in the object space 20, as decoded from the signal on line 40. Although the signals on lines 40, 52, 54, and many other signals herein are shown as single lines, it should be understood that there may be more than one signal associated with each.

A simulated active eye (not shown) is postulated in the object space, for the teaching purpose of broadly describing an associated simulated visual axis actively moving about in the object space, which the passive viewer may analogously follow with his own visual axis 56 in the image space; the images are presented to the passive viewer's eye 42 in the image space from a perspective which analogously coincides with that of the simulated active eye in the object space. In other words, the position of the center of rotation of the simulated active eye in the object space with respect to the objects "observed" and imaged, corresponds to the position of the center of rotation of the passive viewer's eye in the image space with respect to the images of objects presented thereto. The passive viewer's visual axis analogously follows that of the simulated eye because his visual instinct is naturally drawn to cause the high detail part of the image to be cast on his eye's fovea. Thus, the passive viewer's eye 42 mimics such a simulated active eye. An apparatus 58, according to the present invention, shown in the object space of FIG. 2, together with a cameraman 60, approximately provide the function of such a simulated eye. The cameraman's eye 62 provides a moving visual axis 64 and a video camera 66 provides a means of capturing images. The camera, for some applications, is of the miniature type which is mounted in a helmet for the cameraman. The eye 62 is shown directed at an object 68 illuminated by a light source 70, not necessarily localized in the object space. Of course, the object space will have numerous such objects which will successively be engaged by the cameraman's visual attention, over time; merely one such instance is shown. An incident ray 72 is shown impinging on the object 68 and a reflected ray 32 is incident on a lens 74 in the video camera. Numerous similar rays (not shown) combine to form an image of the object in the camera. The cameraman's head may be in close proximity to the apparatus 58 so that the axis 64 in the eye's principal position is more or less parallel to a line normal to the light sensitive surface in the camera. The closer the camera can be placed to the eye 62, the lesser will be the parallax effect caused by the distance therebetween and the closer will the apparatus approximate the postulated simulated eye. An eye position monitor 76 monitors the position of the cameraman's eye 62 by means, for example, of an oculometer, which directs an invisible beam 78 of infrared radiation onto the eye 62 where it is reflected back for detection. An eye position signal, indicative of the direction of the cameraman's visual axis in the object space, is provided on a line 80 to a control 82. The eye position signal 80 is used by the control 82 to control the portion of the object space which will be imaged in a highly detailed manner in the video camera 66 by means of one or more control signals on a line 84. Numerous eye tracking devices, other than oculometers, are generally known in the art of eye tracking and may be found, without limitation, in the U.S. patent literature in class 351/subclasses 6 and 7. For example, a basic oculometer, such as was described above, is disclosed in U.S. Pat. No. 3,462,604. An example of another type of eye tracker, based on the detection of Purkinje images, is disclosed in U.S. Pat. No. 3,712,716. Still another example of a type of eye tracker is disclosed in U.S. Pat. No. 4,561,448, based on electro-oculography. These are examples only and should not be taken as limiting the choice of eye trackers or eye tracking methods, as any type of eye tracking method or apparatus capable of tracking the position of the visual axis of the cameraman's eye is encompassed by the monitor 76.

The camera 66 in turn provides image information over a signal line 86 back to the control 82, where the information is encoded and provided as a video signal on a line 88 to a transmitter 90. It is necessary to point out that the encoding of the video image information into a composite video signal or component signals could as easily be done in the camera 66 itself, rather than the control 82. Similarly, the control function and/or the eye tracking function may be effected within the camera structure also. The transmitter provides a video transmission signal on a transmitting antenna line 92 for transmission to the image space via a broadcast signal line 94. The broadcast signal is detected by a receiving antenna 96 which provides the transmitted video signal to the receiver 48.

It should be pointed out that the video signal ultimately provided on the line 40 to the apparatus 26 may be formed in a manner quite different from that shown in FIG. 2. For example, the object space need not be real and the image signals may be formed by means of traditional or computer animation, without using a cameraman and without monitoring any of his eyes. In that case, the signal on line 40 may not contain image information per se but merely control signals, e.g., for a motion picture camera or for light valves. Similarly, the mixed image signals may be constructed by means of a computer. Furthermore, the images need not be broadcast. They could be provided in other ways, e.g., via cable or from a video tape by means, for example, of a video cassette recorder (VCR). Thus, they need not be generated and viewed at the same time, as in FIG. 2, but may instead be recorded using a recording medium such as video tape for storing the video signals for later display, e.g., using a video playback device. Thus it will be understood that the apparatus 58 of FIG. 2 is merely shown for the purpose of illustrating one way in which a simulated active eye's images may be constructed and delivered for viewing by a passive eye. Other ways are of course within the scope of the present invention.

Figure 3:
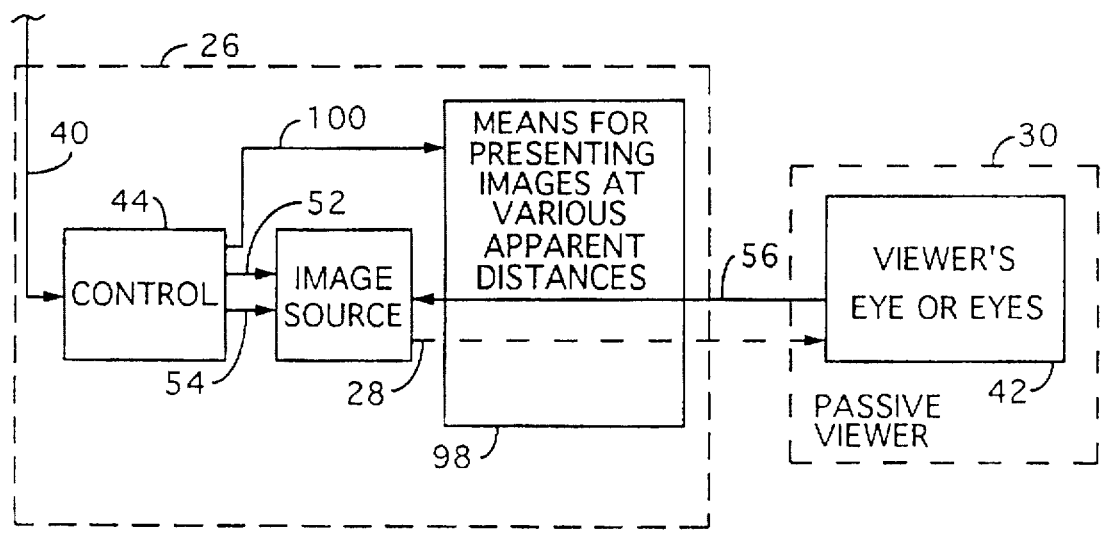
FIG. 3 illustrates a modification of the apparatus in the image space of FIG. 2 in which means are provided for changing the apparent distances of the images presented, according to the present invention.

FIG. 3 illustrates the apparatus 26 of FIG. 2 modified, in a more sophisticated embodiment, to include means 98 for presenting the mixed optical images 28 at various apparent distances, in response to a distance signal on a line 100, indicative of the distance from the cameraman's eye 62 to the object 68. The means 98 may, without limitation, be a variable magnification lens or combination of lenses, such as any of the various types disclosed in the patent literature in Class 350/Subclass 419. The fact that FIG. 3 shows the optical images passing through the means 98 does not exclude, as an alternative, reflection of the images off of a screen for passive viewing. Thus, the means 98 may, also without limitation, be a variable focus mirror, such as disclosed in U.S. Pat. No. 3,493,290. Another example of such a mirror may be found in an article by Eric G. Rawson entitled "3-D Computer-Generated Movies Using a Varifocal Mirror," *Applied Optics*, Aug. 1968, Vol. 7, No. 8, pp. 1505-12. Another approach would be to use a modified refractive state controller, such as disclosed in U.S. Pat. No. 4,190,332; one of the necessary modifications to a device of that kind would be to remove the means for inducing artificial oscillations to attract the patient's attention. However, the idea of moving the screen is an alternative particularly advantageous for a stereoscopic embodiment of the present invention as described below.

It is often said (see, for example, U.S. Pat. No. 4,048,653, column 3, lines 9-24) that the brain is relatively insensitive to eye focus as a clue to the distance of objects seen and that one may therefore present an image at any apparent distance, using the size and perspective of objects as clues, although the viewer's eye remains fixedly focused at a screen, for example. While this is certainly true, especially to the extent that it is consistent with the broad object of the present invention, it is nevertheless a corollary of the teachings hereof to show how to present images at distances or apparent distances which correspond to the distances a viewer would normally experience using his accommodative faculty as an observer in a real object space. In other words, the distance or apparent distance of the image presented is changed in a manner which is consistent with the relation between the degree of accommodation in the normal human eye and the distance of real objects viewed. For each of the distances viewable by a normal eye between infinity and the nearest point of distinct vision there will be a corresponding state of accommodation. According to the present invention, this relationship is preserved by presenting images at apparent distances according to that relationship or one akin to it.

The distance signal on the line 100 is derived from distance information encoded in the video signal on the line 40. The distance information may, without limitation, be obtained in the object space by monitoring both of the cameraman's eyes. For example, in FIG. 4 there are illustrated two eye position monitors 102, 104, one for each of the cameraman's eyes 106, 108. The control 82 is responsive to a pair of signals on lines 110, 112 indicative, respectively, of the separate directions 113a, 113b of the left and right eyes 106, 108 of the cameraman 60. A determination is made by the control 82 of the distance between the cameraman 60 and the object 68 based on the angle between the left and right visual axes at their point of intersection and the known interocular distance. (The control 82 may provide a lens control signal (not shown) for controlling the magnification of the lens 74 but such is not essential). The refractive state of the eyes may be monitored using an objective refractor such as the 6600 Auto-Refractor made by Acuity Systems and described in U.S. Pat. No. 4,190,332. In such a case, the other eye would not necessarily have to be monitored since the assumption could be made that both eyes approximately are at the same accommodation level. There are of course many other rangefinding techniques which may be usefully employed for the same purpose.

FIGS. 5(*a*) & 5(*b*) are illustrations of the principles upon which a variable magnification stationary lens or lens combination 94 may operate in functioning as the means 98 of FIG. 3 for presenting images at various apparent distances for a passive viewer's eye 42. FIG. 5(*c*) illustrates a fixed focal length movable lens or lens combination 116 for similarly functioning as the means 98 of FIG. 3. In all of the illustrations of FIG. 5(*a*)-(*c*), a passive viewer's eye 42 is shown with its visual axis perpendicular to an image plane 118 which might be, for example, an image projected on the inside of a hemispherical screen or provided directly (without reflection) from a CRT, electroluminescent, gas plasma, liquid crystal, or the like display. The distance (d), in each illustration, between the image plane 118 and the vertex of the eye's cornea is the same. The size of an image 120 is also the same for each of the illustrations of FIG. 5. Only the apparent size of the image 120 changes by reason of the different sizes of its image cast on the eye's retina.

In FIG. 5(*a*), the eye 42 is shown with its crystalline lens 122 in the accommodated state, i.e., apparently for viewing an "object" 120 close up. A variable magnification lens 114 is interposed between the eye 42 and the image 120 for changing the apparent size (and hence the apparent distance) of an image 124 cast on the eye's retina 126. A bundle of rays 128 is illustrated emerging from a point 130 at one end of the image 120 and their paths through the lenses 114,122 may be traced all the way to the point's image 132 on the retina 126. Similar paths could be drawn to illustrate the retinal imaging of all the other points of the image 120.

In FIG. 5(*b*), the eye 42 is shown with its crystalline lens 122 in the unaccommodated state, i.e., apparently for viewing a distant "object" 120. The variable magnification lens 114 is now shown schematically with a shorter focal length than it had in FIG. 5(*a*). This results in a smaller retinal image 134 which can only be kept in focus on the retina by changing the shape of the crystalline lens 122, as shown. The size and thus the apparent distance of the image is reduced and a passive viewer viewing such images experiences the sensation of viewing a distant object.

Figure 6:
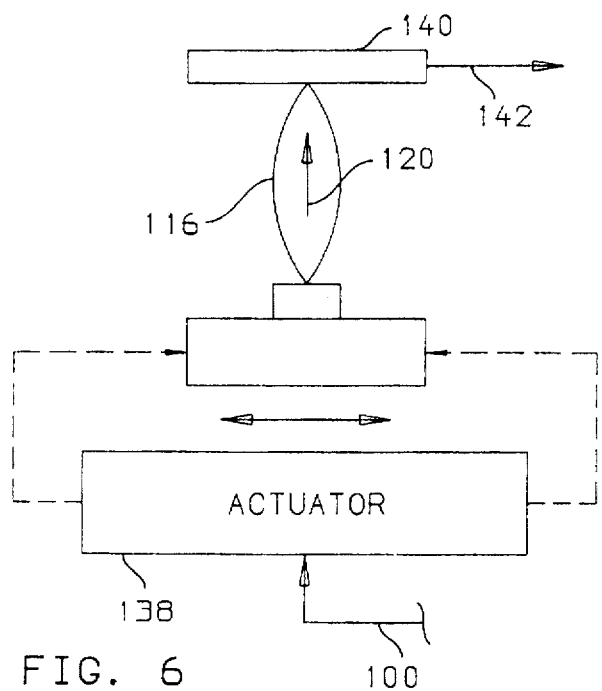
FIG. 6 shows a positional actuator for moving a lens, according to the present invention.

In FIG. 5(*c*), the eye 42 is again shown in the unaccommodated state, as in FIG. 5(*b*), except that here the apparent effect of viewing a "distant object" is achieved by moving a lens 116 from a close distance (c) to a farther distance (c+e) from the cornea. A retinal image 136 formed in this way has the same size as image 134 of FIG. 5(*b*). positional translation of lens 116 or image surface 120 as shown in FIG. 5(d) may be effected by means of a positional actuator 138 controlled in a position control system such as is shown in FIG. 6. A position sensor 140 may be provided to provide a feedback signal on a line 142 to the control 44 of FIG. 3. proportional, proportional-plus-integral, proportional-plus-integral-plus-derivative, any combination of proportional, integral or derivative, or any other well known closed loop control system techniques may be used in the control 44 to maintain the lens 114, image surface 120 or means 98 at the commanded position.

It should be understood that the approach selected for the variable magnification means 98 of FIG. 3 may be taken from a wide variety of possible approaches. These include liquid lenses with refractive properties that change according to changes in the volume of liquid between one or more movable or flexible surfaces of such lenses. See, for example, U.S. Pat. No. 4,289,379 to Michelet which discloses a principle which may utilized for a variable magnification lens. Therefore, the specific approaches described herein should be understood as being merely incidental choices and not in any way limiting the central core idea, as expressed in several of the dependent claims, of presenting the mixed images to a passive viewer at various apparent distances. Thus, for example, as previously suggested, the position of the image plane 118 could also be changed in a manner similar to that shown in FIG. 5(d). There, the image plane is movable in a direction further away from the eye 42 as shown an added distance f for a total distance of d+f, and is also movable in the opposite direction (not shown) closer than distance d to the eye 42. The object is to achieve the same effect, i.e., of presenting images at various apparent distances.

Figure 7A:
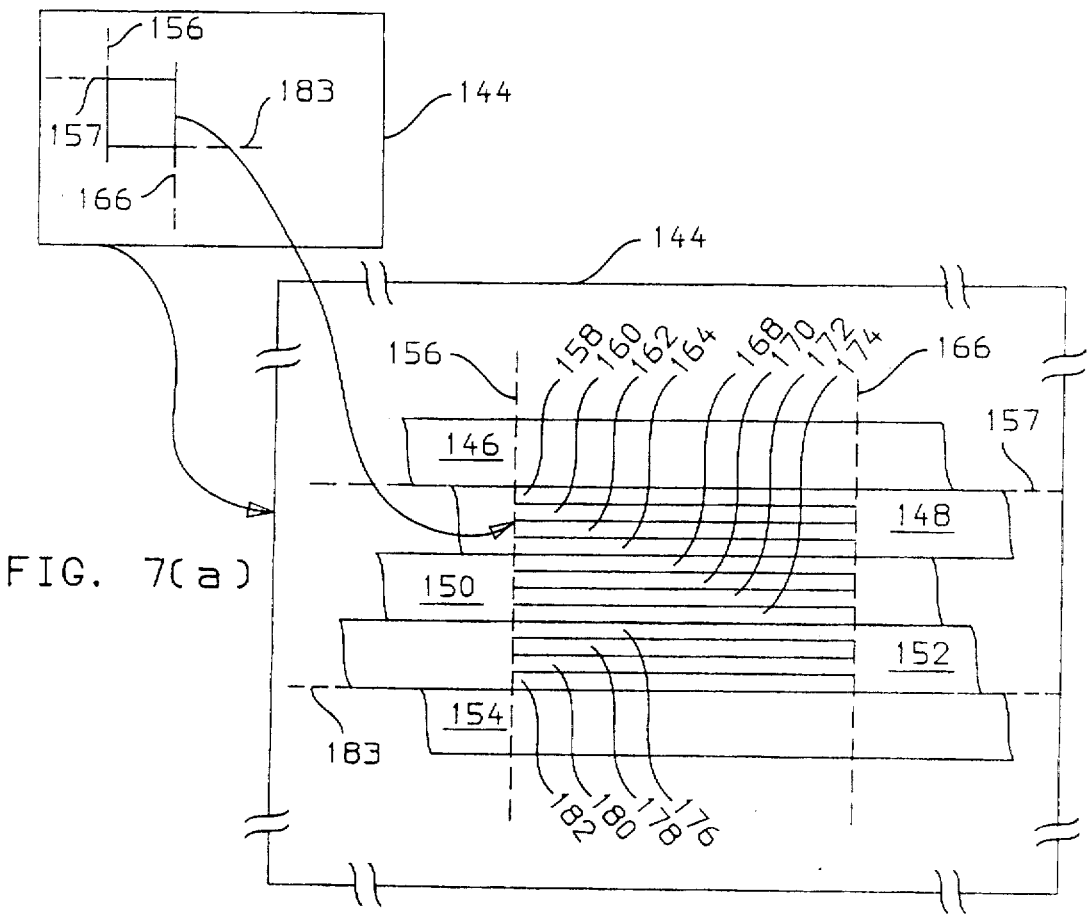
FIG. 7(a) is a simplified illustration of a portion of a display surface, according to the present invention

FIG. 7(a) is a simplified illustration of a portion of a display surface 144 on, for example, a cathode ray tube (CRT) display scanned in a manner consistent with the object of the present invention. Although a CRT display is described, it will be understood that other types of displays may be used equivalently. These include but are not limited to the various types of electroluminescent (EL), gas discharge, liquid crystal (LC), ferroelectric, electrochromic, electrophoretic, vacuum fluorescent, thin-film transistor (TFT), silicon switches, semiconductor switches with capacitors, metal-insulator-metal (MIM), combinations of the foregoing, or any of the other emerging display technologies presently being developed or to be developed which are reasonably within the scope of the claims of this patent during the term hereof.

The scanning method described is consistent with a scanning method described in U.S. Pat. No. 4,513,317 but the scanning method described in that patent and those described in that patent and those described in this patent are in no way limiting to the present invention, i.e., as to the method of constructing a fine detail image area amidst a coarse image detail area. For the sake of shortening this specification, the various FIGURES and related textual material of that patent will be omitted, but are hereby expressly incorporated by reference.

Five coarse scanning lines 146, 148, 150, 152, 154 are illustrated in FIG. 7(a) herein, in truncated form. These sections of lines represent only a small portion of the total number of coarse scanning lines on the image pickup or display surface 144, the total number being up to the designer, but typically, without limitation, being on the order of hundreds. For example, eighty, a hundred, two, five, twenty or any number hundred or fraction of a hundred coarse scanning lines might be selected to scan a display surface. These might be assembled adjacently in sequence or may be interlaced in some convenient manner to eliminate flicker by providing more numerous images, albeit of less detail. A coarsely focused electron beam is one means of producing a low detail area 315 such as is shown in FIG. 2 of U.S. Pat. No. 4,513,317.

Also pictured in FIG. 7(a) herein are four fine scanning lines within each of the three coarse scanning lines 148, 150, 152 which together (as twelve fine lines) very roughly correspond to the fine detail area 310 of FIG. 2 of U.S. Pat. No. 4,513,317. These can be formed by interrupting the coarse scanning beam which forms coarse left-to-right scanning line 148 at a vertical boundary 156 and a horizontal boundary 157, at the intersection of boundary lines 156, 157, sequentially commencing a fine four line scan 158, 160, 162, 164 within coarse line 148, each line of which terminates at a vertical boundary 166 and, in a similar manner, within each of the coarse lines 150, 152, respectively, forming fine lines 168, 170, 172, 174 and 176, 178, 180, 182, stopping the fine lines at a line 183. Together, the twelve fine scan lines of FIG. 7(a) form a small, highly detailed image area amidst a generally coarsely detailed CRT display surface. Of course, the coarsely and finely scanned portions may be scanned during separate periods of a field or a frame or even in different frames. This is a matter of choice.

Figure 4:
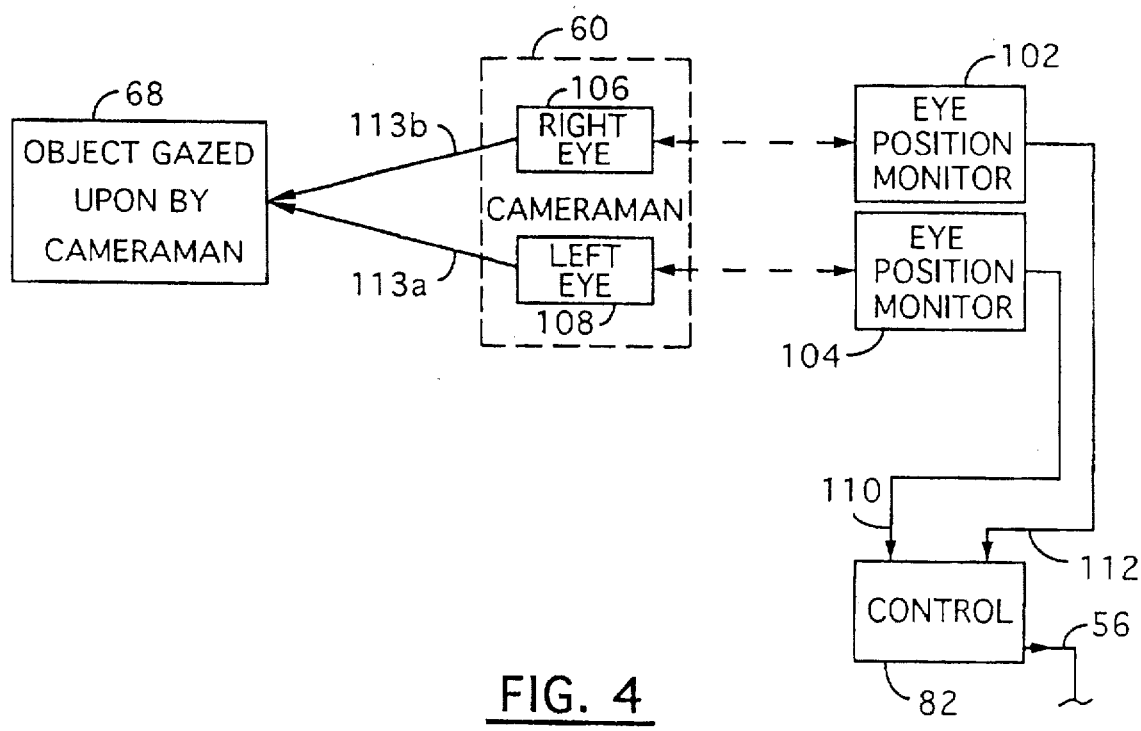
FIG. 4 is an illustration of two eye position monitors and a control which may be used, according to the present invention, to determine the distance to objects of regard.
Figure 5A:
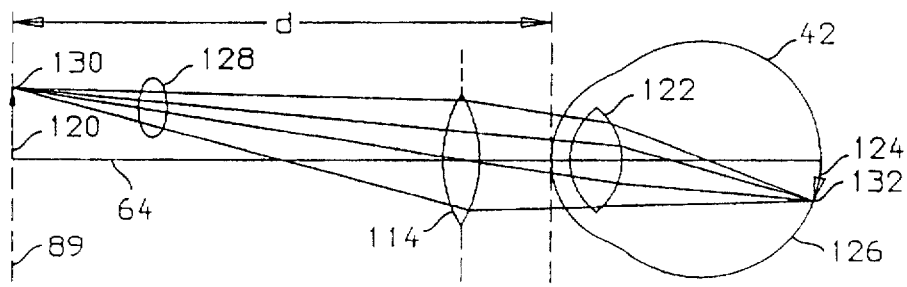
FIGS. 5(a)–(d) are illustrations of various methods of providing images at various apparent distances, according to the present invention.
Figure 5B:
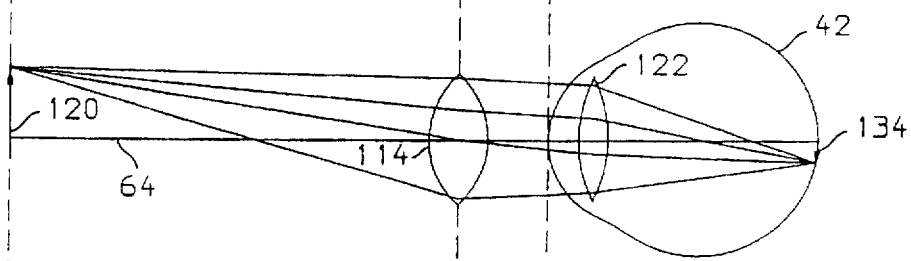
Figure 5C:
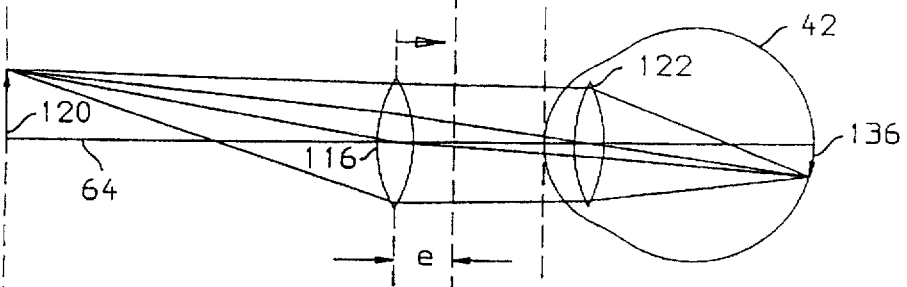
Figure 5D:
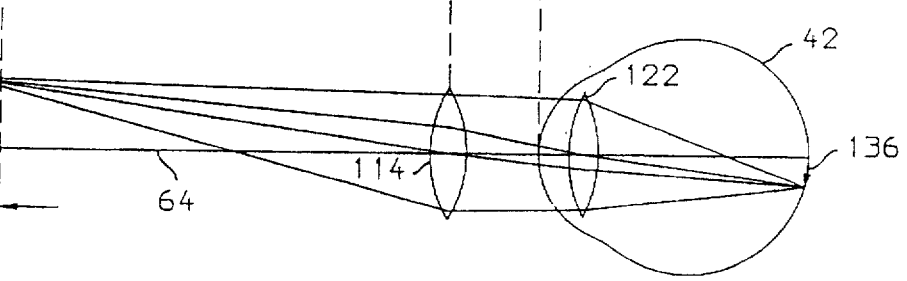

The position of the highly detailed area on the display surface is caused to change according, for example, to the magnitude of the eye position signal 80 of FIG. 2, or the magnitude of one or both of the eye position signals 110, 112 of FIG. 4. This can be carried out using much of the camera apparatus illustrated in FIG. 5 of U.S. Pat. No. 4,513,317 but modified to include monitoring a cameraman's eye or eyes to control the fine detail scanning at the camera end rather than an active remote viewer at the display end. The highly detailed image area is replicated in the image space 22 by means of the display apparatus 26 which could be carried out as well using the display apparatus of FIG. 6 of U.S. Pat. No. 4,513,317 modified to omit monitoring the remote viewer's eye.

The modified composite video signal illustrated for one frame's field in FIG. 4 of U.S. Pat. No. 4,513,317 is an acceptable format for encoding the coarse and fine image information as well as the position information in video signal form but should in no way be considered a limitation on the present claims since there are numerous possible other ways of encoding the coarse and fine image information. For example, the methods described in U.S. Pat. 3,491,200 could, without limitation, be used as well. The apparatus and methods suggested in U.S. Pat. No. 4,513,317 have been cited for illustrative purposes only.

It will be understood that although the technologies used for illustrative purposes herein are of the black and white type, the inventive concepts disclosed and claimed herein are of course not restricted thereto since the same concepts may be utilized in the corresponding color type.

Figure 7B:
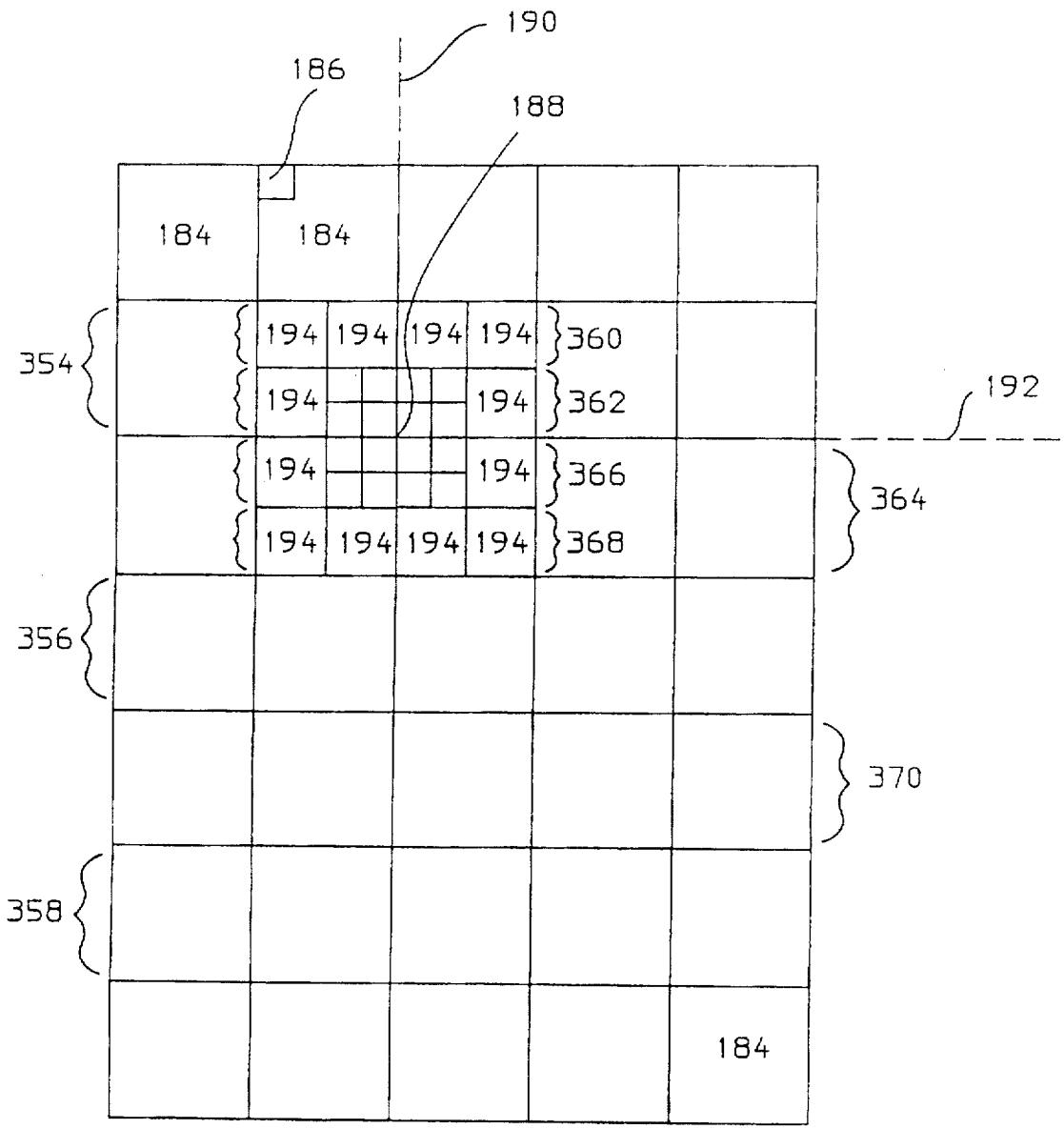
FIG. 7(b) is an illustration of the present invention as carried out on a display surface, for example, having addressable pixels.

FIG. 7(b) is an illustration of a display surface on, for example, a flat panel display having a large number of controllable cells or pixels, each capable, e.g., of displaying various shades of gray or, alternatively, of being used as binary cells, each used for displaying one shade of white and one of black only but set up for scanning by means of pulse width modulation for integration in the viewer's visual apparatus over time as various shades of gray. (The achievement of good gray scale performance requires a contrast ratio of about 50 to 1, with the brightness/contrast either continuously variable or, if quantized, controllable into at least sixteen logarithmically spaced steps. Sixty-four shades are desired for good, aesthetically pleasing picture quality). Thus, it is known in the art to use both an analog signal amplitude and a digital pulse width modulated signal for controlling pixel luminance.

Although analog techniques of achieving gray scale are generally visually superior and easier to implement, many types of flat panel displays cannot use analog control for a variety of reasons. Besides the pulse-width modulation technique described above, other techniques such as multiple display cells per pixel, changing the element's duty factor on a frame-time basis, introducing panel instabilities, and others are known.

The fundamental parameter, in any case, is the percentage of time available to address a pixel which directly limits the average brightness of a display panel. Luminance or contrast is affected by the amount of instantaneous power that a display material, and other components, can tolerate during the duty cycle. Some display materials (LCDs) do respond to short electric pulses and some (electroluminescent and cathodoluminescent materials) become more efficient when high-power pulses are applied.

In one type of multiplexing, each pixel is turned on for a fraction of the time equal to the frame time divided by the number of pixels. If the frame is repeated at a frequency above the critical flicker frequency, the viewer's visual apparatus will integrate the pulses and flicker will not be seen. For a frame repetition rate comparable to commercial TV, this scheme only allows 140 ns to address a pixel. In another type of multiplexing, the time "on" per pixel can be increased to approximately 65 microseconds by line-at-a-time addressing, i. e., the dwell time per pixel is increased by a multiple equal to the number of columns. Thus, the duty cycle per pixel is equal to the frame time divided by the number of rows. All the columns can thus be randomly addressed in parallel without further complicating cross-coupling in any other row.

The basic principles presented are the same for a color display, but are described here in terms of black and white because the principles are the same because the colors presented by a color display will have a lightness or luminance attribute which is directly analogous to a gray scale. Therefore, it will be understood that the scope of the invention covers the presentation of color images, as well as black and white. Moreover, the scope of the invention is not limited to presenting images by means of a liquid crystal, electroluminescent, CRT, gas plasma, electrophoretic, electrochromic or any other specific display type. Other suitable display technologies, both analog and digital, emissive and nonemissive, are certainly within the scope of the invention. Of course, the choice of display technology will determine the character of the individual picture elements (pixels) and the manner of assembling coarse and fine composite images. For example, a CRT approach might utilize a coarsely focused electron beam for scanning wide image areas and a finely focused electron beam for scanning the small, highly detailed portion of the composite image. Such a CRT scanning approach for a retinally stabilized differential resolution television display is disclosed by Ruoff, Jr. in U.S. Pat. No. 4,513,317, as described above in connection with FIG. 7(a). For flat panel displays the pixels may be addressed in a number of different ways including but not limited to direct (such as is used in alphanumeric and very large displays), scanning (used in CRTs and laser displays), parallel (used in projection displays and large screens), matrix (generally used in flat panel displays), and grid (used in flat panel displays and flat CRTs). Flat panel displays generally use only the matrix or grid techniques.

Although flat panel embodiments of the present invention are not limited to a matrix of pixels arranged orthogonally, that arrangement is in general use and will be used for descriptive purposes. Each pixel has a row and column address. A matrix 480 by 500 columns has been selected for the descriptive purposes of this specification. Such is comparable to commercial TV, having a total of 240,000 addressable pixels. To use an individual wire for each pixel is virtually impossible unless the matrix is the size of a billboard. However, individual conductors can be used for each row and each column.

A pixel was formerly usually a two terminal device but three terminal devices are becoming much more common. When a voltage is applied between the two terminals of a two terminal device, a contrast phenomenon occurs. In an orthogonal matrix addressed display, each pixel has one terminal ganged together with other pixels in a row and the second terminal ganged together with the other pixels in an orthogonal column. When a pixel is selected, its row and column leads are energized. None of the other pixels are selected intentionally, but "sneak paths" do exist. A fraction of the applied voltage exists across all pixels. If the pixel image medium is approximately linear, then a corresponding image background occurs and destroys the image contrast. Analogous hookups are used for stimulating similar contrast phenomena in three terminal devices.

The problem of addressing a matrix is compounded further when a second pixel is selected simultaneously on another row and column. Ideally, only the two pixels would display. In reality, however, two additional pixels would also see the full voltage across their terminals. The four pixels would constitute the corners of a rectangle formed by the intersection of the two column lines and the two column lines and two row lines.

The sneak-paths and four-pixels problem are fundamental to the matrix-addressing technique. The sneak-paths problem is solved by using pixel devices with nonlinear properties, i.e., devices that are not excited at fractional voltages. The four-pixels problem is solved by using a technique called line-at-a-time addressing, where only one horizontal line lead is addressed at any instant. All column leads are addressed in parallel. This time sharing, or multiplexing, greatly reduces the time allowed for pixel addressing. A display material must be responsive to a short duty cycle if it is to be multiplexed. Although there are few materials that possess these two properties, the nonlinearity requirement can be achieved by adding a switch at each pixel matrix junction in the form of a diode, a field-effect transistor (FET), or a thin film transistor (TFT); the short duty cycle and lack of fast display response can be overcome by adding a capacitor at each junction. It is charged at multiplexing rates and discharges to excite the display material during the balance of the frame time.

A portion of a display surface is illustrated in FIG. 7(b) for one particular composite image design. Large squares 184 are each made up of sixteen small pixels 186. All the large squares 184 are controlled at the same shade of gray and are assembled in coarse horizontal scanning lines to form lesser detailed image areas. Each coarse line is four small pixels wide. A small section of seven such coarse horizontal scanning lines is shown in FIG. 7(b). Such coarse squares may be assembled in any suitable manner, depending on the particular display technology employed and depending upon convenience. One large square is centered on the intersection 188 of lines 190 and 192 and is made up of sixteen pixels, each individually controllable for display at various shades of gray. Twelve intermediately sized squares 194 of four pixels each, are assembled around the periphery of the central square centered at 188 to help form a highly detailed image area. The intermediately sized squares 194 are located around the periphery of the single, fine-detail large square centered at 188. All of the four pixels in any given intermediately sized square 194 are controlled for display at the same shade of gray. Again, a fine-detail large square of fine pixels such as that illustrated centered at 188 and the plurality of intermediately detailed squares 194 may be assembled in any convenient manner. The use of intermediately sized squares smoothes the transition from high detail to low detail image area in a manner very roughly similar to the population fall off of cones from the center of the fovea. See, for example, FIG. 2 of U.S. Pat. No. 3,953,111 and FIGS. 3 and 9 of U.S. Pat. No. 4,479,784 for plots of visual acuity as a function of angular displacement from the fovea. Of course, a more complicated structure would be necessary to truly replicate the foveal fall off and such is certainly within the scope of the presently claimed invention.

The compositeness of the assembled image may also be effected by any convenient method. For example, each successive composite image may be composed by firstly assembling and presently a coarsely detailed image over the entire field of view (e.g., in a first field or frame) and secondly assembly and presenting a finely detailed image over only a small portion of the full field of view (in a second field or frame). Other, equally satisfactory approaches may of course be employed. For another example, the coarsely and finely detailed portions may be assembled at the same time (in the same frame or even the same field). The word "composite" is appropriate in some circumstances, according to the present invention, to describe the melded image assembled as, for example, in FIG. 7(b). However, for certain other methods of assembling picture elements or pixels to achieve the same object, the word "composite" is not quite right. For example, FIGS. 8–12, without limitation, show several other approaches which are possible for constructing images having both highly detailed and lesser detailed components. Most of these would most likely be implemented using a CRT approach in which a scanning electron beam is used to trace the lines which form the scanning patterns illustrated. There are no easily discernible boundaries between the highly and lesser detailed areas in FIGS. 8–12, at least, and thus there is no "composite" image, as in FIG. 7(b), where image components of clearly distinguishable resolution are brought together. A broader term, which covers both the composite approach of FIG. 7(b) and the approaches of FIGS. 8–12 is "mixed" image. This term is used herein to cover both approaches.

Figure 8:
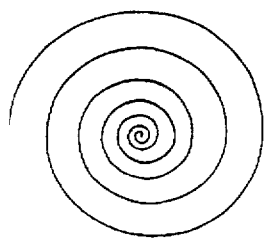
FIGS. 8–12 are illustrations of various scanning techniques for constructing mixed images, according to the present invention, without limitation.
Figure 9:
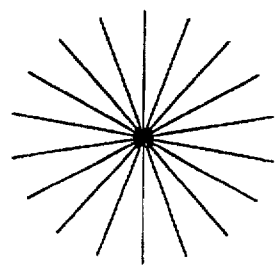
Figure 10:
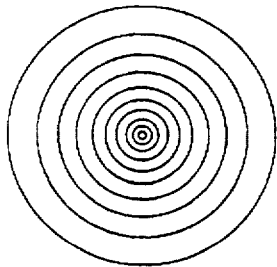
Figure 11:
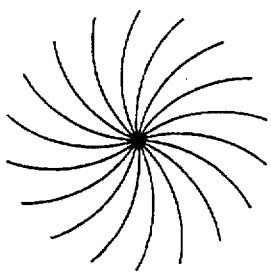
Figure 12:
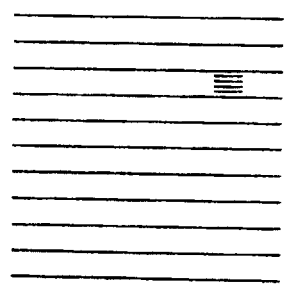

FIGS. 8–12 show various scanning patterns which represent only some of the many patterns which might be employed in achieving the objects of the present invention. FIG. 8 shows a spiral scanning pattern in which the highly detailed image information is concentrated in the center of the spiral. The spiral may be more tightly wound in the center than would be called for by a strict application of an Archemedian spiral, for example, in order to intensify the high detail effect at the center. The entire scanning pattern is mobile as a unit. FIG. 9 shows a pattern made up of a plurality of intersecting lines. FIG. 10 shows a pattern made up of a plurality of concentric circles. The circles in the center may be more closely spaced than those at the periphery. FIG. 11 shows a pinwheel pattern. FIG. 12 shows a coarse raster pattern for background and a fine raster pattern for detailed image information. The small, detailed raster may be made mobile with respect to a stationary background (stationary, that is, in the absence of head movements), as implied by FIG. 12 and as described in detail above in connection with FIGS. 7(a) and 7(b), or may be moved in tandem with the background.

Other scanning techniques not shown might include variations on Lissajous scanning, decreasing rectangle, perpendicular, angular, sine wave, etc., in which a small, highly detailed area is inherent or is introduced. In all cases, the human visual process is simulated by changing the portion of the object space imaged by the finely detailed image area. This may be accomplished by either of two methods. The first is to make the finely detailed area mobile with respect to the lesser detailed area to simulate ductions. Using this approach, changes in the image content of the lesser detailed area is solely indicative of head movement. The second way is to change both areas at the same time to simulate, at any given moment, either ductions solely or head movements solely, or both ductions and head movements at the same time. For example, supposing that in FIG. 7(b), the full image area (only a fragment of which is shown) covers the full field of view of a left eye in which the upper portion of the image is bounded by the left brow, the right by the nose, the bottom by the left cheek and the left by the limits of peripheral vision. If the first method is chosen then the image content of the large squares 184 will remain the same for as long as the simulated eye's head remains stationary. For a case in which the images are formed by means of a cameraman, this corresponds to for as long as the cameraman's head remains stationary. The image content of the highly detailed component 188, 194, on the other hand, changes to simulate eye rotations. It changes its image content by changing its position within the boundaries described. For the example, this might mean that the highly detailed component in FIG. 7(b) would change its position from the upper left center portion of FIG. 7(b) to the lower right center portion. This would of course induce a change in the direction of the visual axis of the viewer in the image space, for example, from an elevation away from the nose to a depression toward the nose by means of a combined infraduction and adduction. This change would correspond to a similar change in the direction of the simulated eye's visual axis in the object space.

On the other hand, if the second method is chosen, the highly and lesser detailed areas will move in tandem to simulate eye rotations while at the same time both the lesser and highly detailed areas will change their image content to simulate head movement, even if the simulated eye's axis remains fixed relative to the head.

Figure 13A:
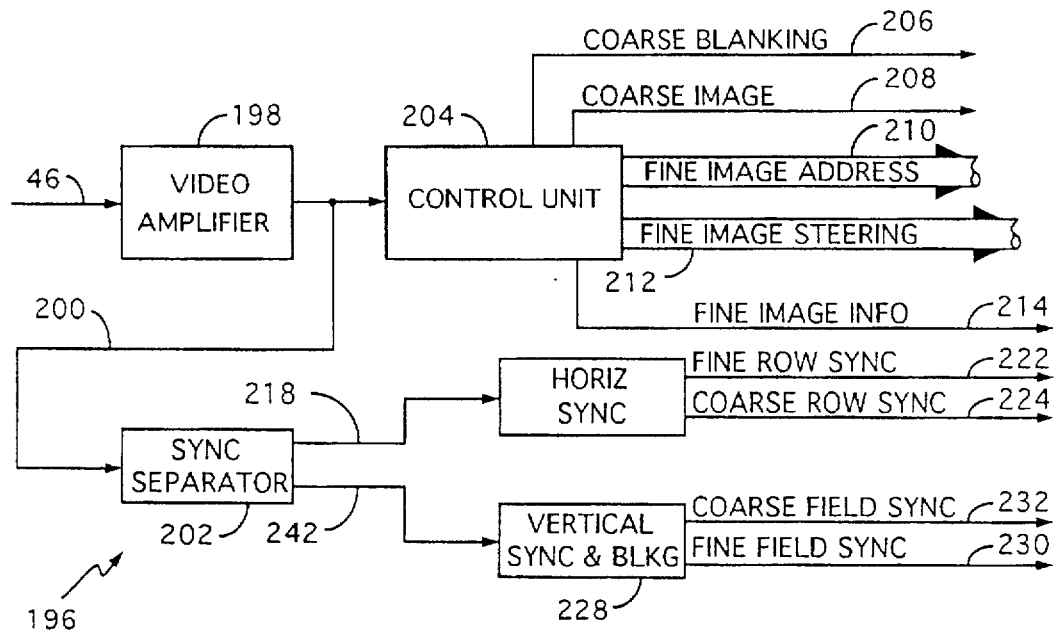
FIG. 13(a) is a block diagram of an apparatus usable for controlling the construction of mixed images in a display, according to the present invention.
Figure 13B:
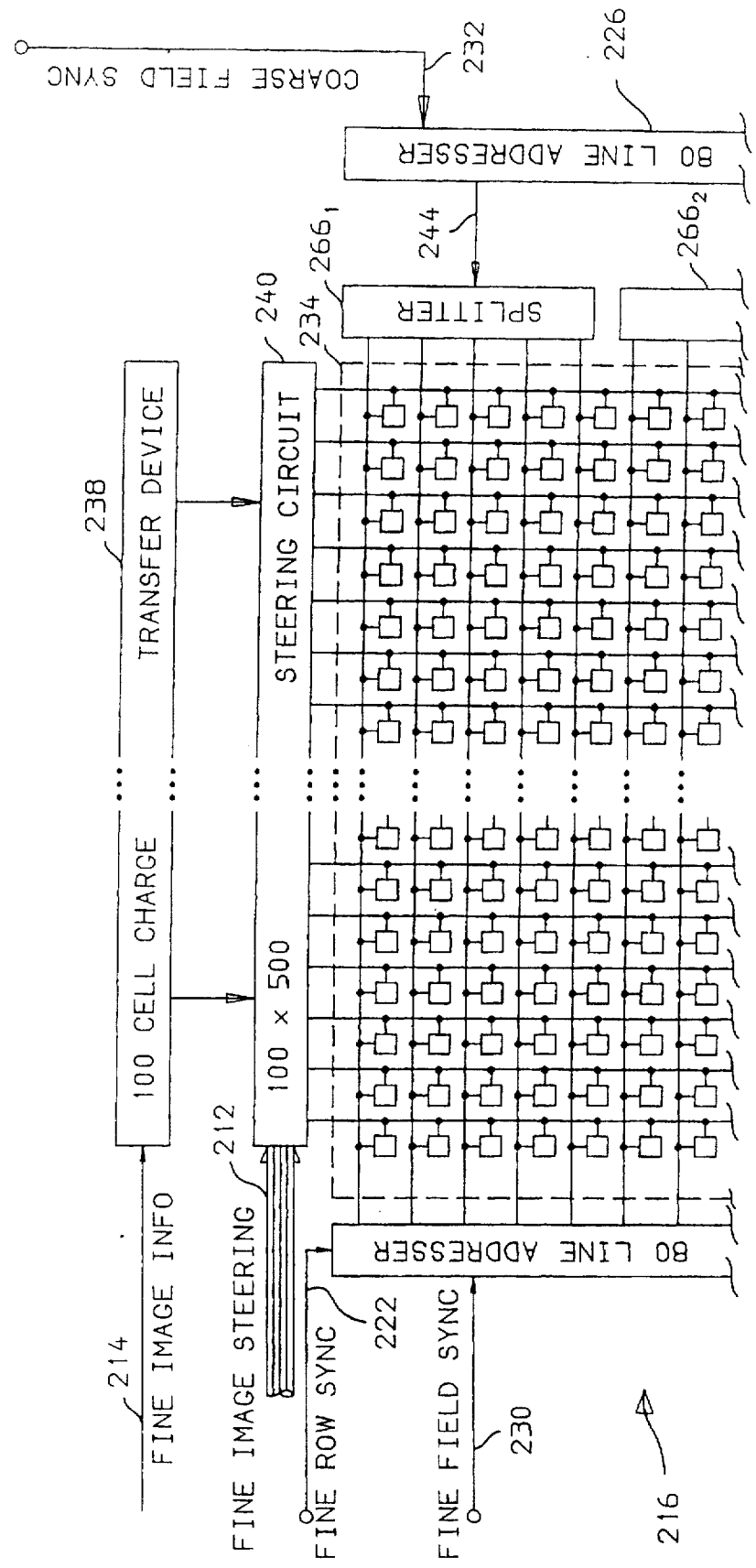
FIGS. 13(b) and 13(c) together form a block diagram of a display controlled by the apparatus of FIG. 13(a), according to the present invention.
Figure 13C:
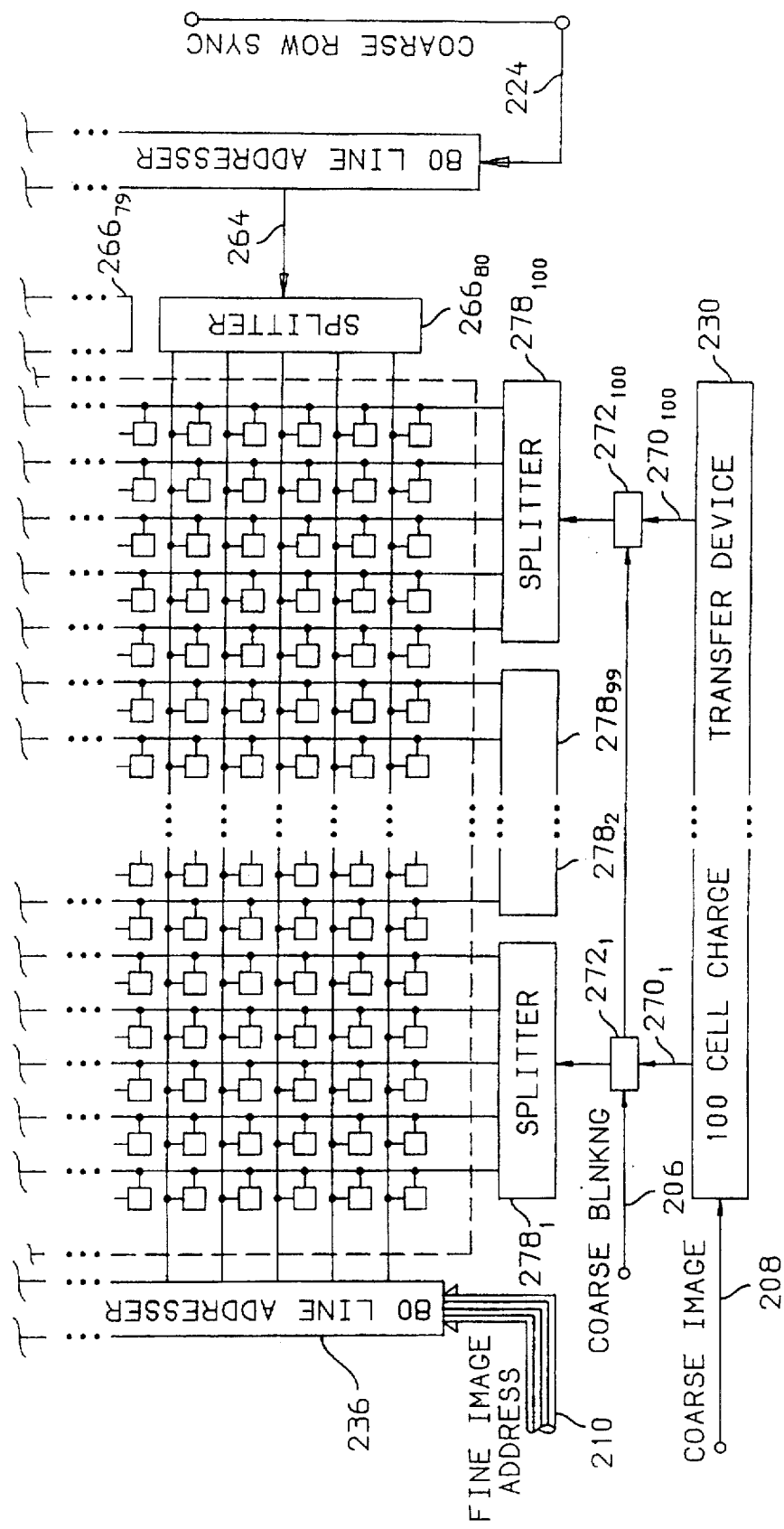
Figure 13D:
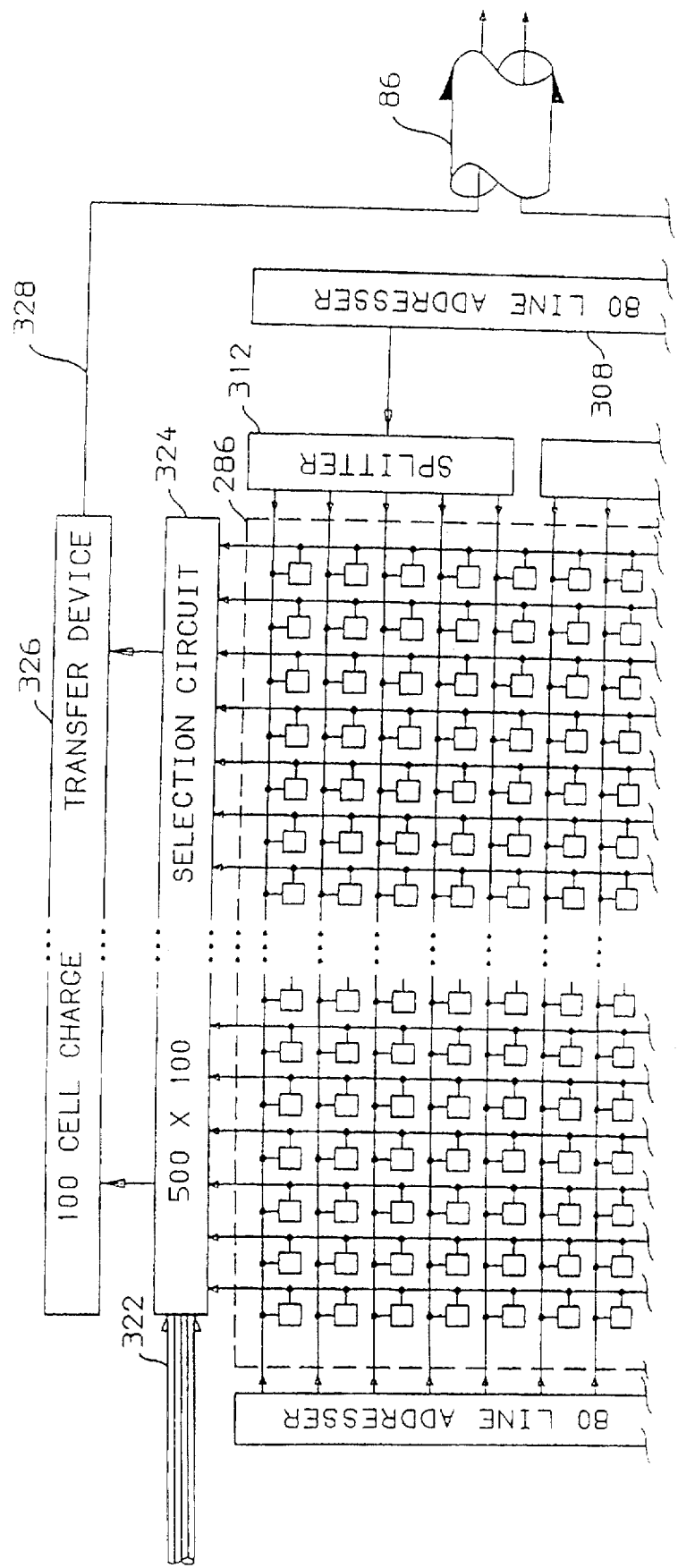
FIGS. 13(d) and 13(e) together form a block diagram of a solid state camera for providing a video signal having mixed image information encoded therein for display apparatus such as that of FIG. 13(b) and 13(c), according to the present invention.
Figure 13E:
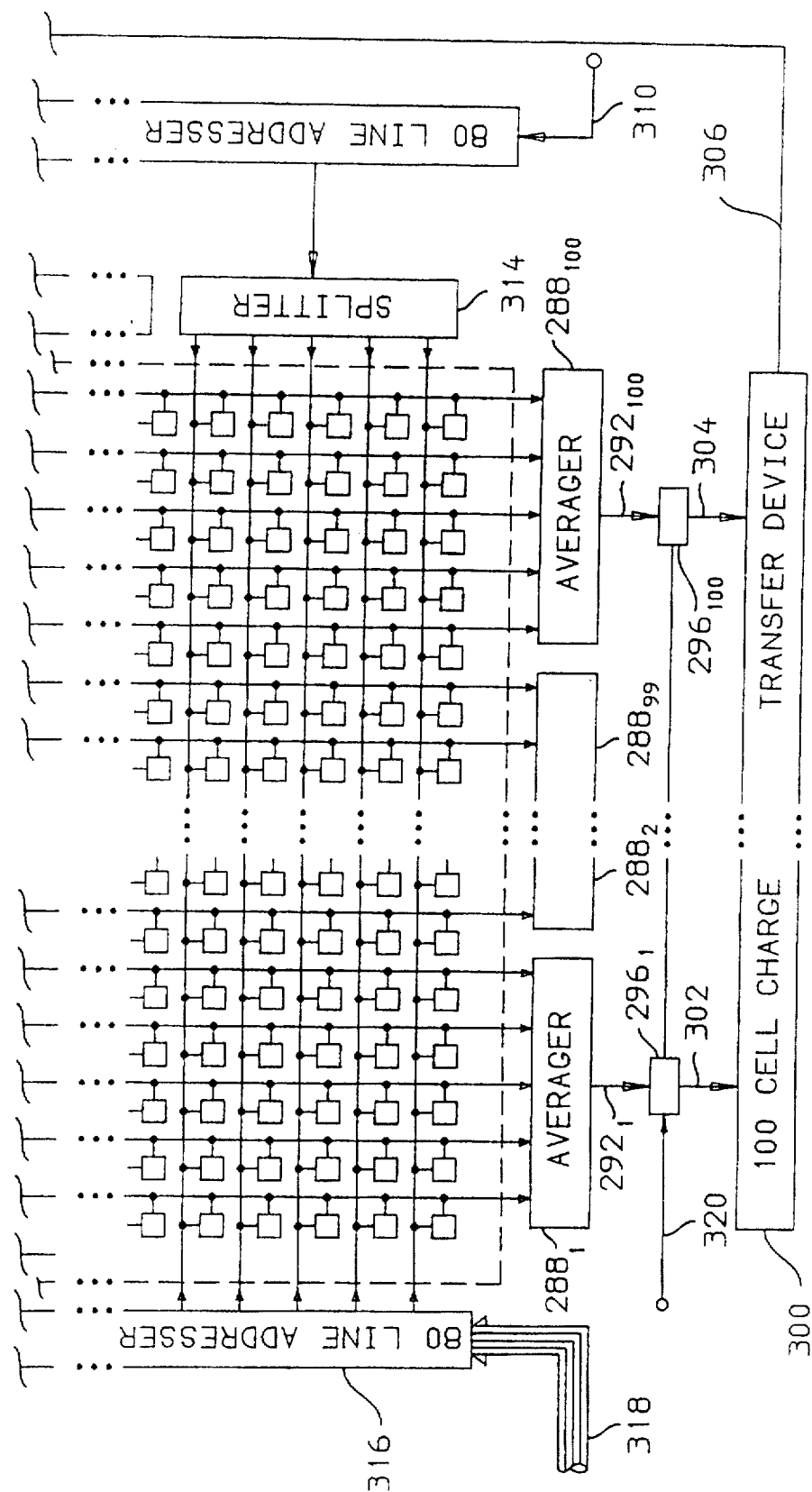

FIG. 13(a) is a simplified block diagram illustration of an apparatus 196, similar to the control 44 of FIG. 2, according to the present invention, without limitation. The apparatus of FIG. 13(a) is particularly suited for a display such as is used to produce a mosaic version of FIG. 12, for a fine raster either fixed or mobile with respect to the coarse raster and, which is also amenable to being constructed using a camera pickup 66 such as is illustrated in FIG. 2 using a light sensitive matrix such as is illustrated in FIG. 13(c) and displayed using a matrix display such as is illustrated in FIG. 13(b). A video amplifier 198 is responsive, for example and not by way of limitation, to a composite video signal on the line 46. The video amplifier provides an increased amplitude version of the signal on the line 46 on a line 200 to a synchronizing signal separator or stripper 202.

A control unit 204 is also responsive to the amplified video signal on line 200 and includes control circuitry for supplying a coarse image blanking signal on a line 206, a coarse image information signal on a line 208, a fine image address signal on a line 210, a fine image steering signal on a line 212 and a fine image signal on a line 214.

A display structure such as, without limitation, a matrix display 216, is shown in FIG. 13(b) and is responsive to control signals from the control 196 of FIG. 13(a) for displaying pixels having the proper lightness or luminance which, when displayed together, effect the desired image pattern. The sync separator 202 of FIG. 13(a) strips horizontal synchronizing pulses from an amplified composite video signal on line 200 and provides them on a line 218 to a horizontal synchronizing circuit 220 which provides a fine row sync pulse on a line 222 to the display of FIG. 13(b). The horizontal sync circuit also provides a coarse row sync pulse on line 224. The sync separator 202 also strips off a vertical synchronizing pulse during the vertical synchronizing period between each coarse field and provides a signal indicative thereof on a line 242 to a vertical synchronizing and blanking circuit 228 which provides a fine field sync signal on a line 230 to the display. Similarly, a coarse field sync signal is provided on a line 232. The control within the display will control the sequential display of the proper rows (horizontal lines) and fields according to the horizontal and vertical sync signals, respectively.

Referring back to FIG. 13(b), a 500×400 matrix display 234 is shown, without limitation, for providing mixed images in response to the image and control signals of FIG. 13(a). The illustrated matrix is "scanned" one line at a time for fine imaging using an eighty line addresser 236 which addresses any eighty adjacent lines out of the four hundred available in sequence starting at a line addressed by the horizontal address signal line 210 and continuing in sequence until all eighty lines are scanned, prior to each such line scan, one hundred fine image signals are assembled in a charge transfer device 238 in response to the image signal on the line 214 and are demultiplexed or otherwise steered into one hundred adjacent vertical lines by a 100×500 steering circuit 240 in response to the vertical address signal on the line 212. The eighty line scan of one hundred pixels per line produces a fine image rectangular area of eight thousand pixels out of the two hundred thousand pixels in the matrix, representing 4% of the surface area. The relative position of the fine image area will of course change from successive image to successive image.

The steering circuit 240 may, for example, comprise a first plurality of demultiplexers in a first stage and a second selected plurality of demultiplexers in a second stage. For example, each of the one hundred signals from the charge transfer device 238 may be connected at a first stage as an input to a corresponding 1-to-20 demultiplexer. Each of the twenty outputs of each of the one hundred first stage demultiplexers may be connected as an input to a 1-to-25 demultiplexer to form a second stage. This would allow any of the one hundred outputs of the device 238 to be switched to any of the five hundred columns of the matrix. And of course a selected group of a hundred adacent columns may have all hundred outputs switched to them. Since this involves a very large number of connections, such may be reduced by various techniques. One technique would be to only allow the first of one hundred fine lines to be positioned within the range of one to four hundred of the five hundred lines. In that case, the one hundredth fine scanning lines would be confined to lines one hundred to five hundred. Other techniques, without limitation would include reducing the size of the highly detailed scanning area, by skipping scanning lines or other similar techniques. Any other switching scheme may be used as well.

The coarse part of the mixed image may be provided by "scanning" five adjacent lines at a time, each five line group being treated as a single line of one hundred (5 pixel by 5 pixel) coarse picture elements. Each 5×5 pixel coarse picture element may be treated as an elementary pixel. I.e., all twenty-five pixels assume the same shade of gray (for black and white applications). The matrix may thus be coarsely scanned from top to bottom by eighty coarse horizontal scanning lines of one hundred coarse picture elements each. This may be accomplished using another eighty line addresser 242 which provides output signals sequentially on eighty separate output lines 244, 246 (not shown), . . . , 248 (not shown), 250 (not shown), 252 (not shown), . . . , 254 (not shown), 258 (not shown), . . . , 260 (not shown), 262 (not shown), 264 in conjunction with eighty separate splitters $266_1, 266_2, \ldots, 266_{79}, 266_{80}$, each being associated with one of the eighty output signals from the addresser 242. Each splitter splits each output signal it receives into five similar signals for addressing five separate horizontal lines at a time. Thus, all four hundred lines of the matrix may be coarsely scanned using eighty coarse scanning signals in conjunction with eighty splitters. During the period in which a given coarse line is scanned, a one hundred cell charge transfer device 230, which may be thought of as an analog shift register, provides 132 stored signals it had previously received serially from coarse image signal line 208 on lines $270_1, 270_2, \ldots, 270_{99}, 270_{100}$ (100 signal lines) to a corresponding gate $272_1, 272_2, \ldots, 272_{99}, 272_{100}$ (100 gates), each gate being responsive to the coarse scanning gate signal on the line 206. This signal serves the purpose of blocking the display of image information over portions of selected horizontal scanning lines that are scanned instead by fine scanning lines. Thus, in the illustration, the actual coarse image intelligence is blocked from being displayed. For each full frame, there will be twenty adjacent gates selected out of the one hundred gates $272_1, \ldots, 272_{100}$ in sequence which will be used for blocking coarse image information. The particular timing and position of twenty adjacent blocking gates will of course change from frame to frame depending on the magnitude of the eye position signal 80 (FIG. 2), which is translated by control unit 204 or 82 into the proper timing for the signal on the line 206 and also into the proper control signals for signal lines 208, 210, 212, 214, also by either the control 82 of FIG. 2 or the control 204 of FIG. 13(a). Thus, during sixteen of the eighty coarse scanning lines, only eighty of the one hundred signals on lines $270_1$, through $270_{100}$ will get through to a corresponding eighty out of a hundred splitters $278_1, 278_2, \ldots, 278_{99}, 278_{100}$. There will thus be a rectangular "hole" of twenty consecutive vertical lines somewhere on the screen, at any given moment, according to the direction of the eye of the cameraman.

Of course, a corresponding scanning process will have been most advantageously, but not necessarily (e.g., alternately via computer simulation or animation), carried out in exactly the same manner in the camera apparatus 58 of FIG. 2 except in reverse. In that case, the sync, addressing and control signals on lines 210, 206, 208, 214 are first generated in the control 82 in the image space for controlling the scanning of the video camera and are encoded into the composite video signal on line 40 provided for display purposes and the control 204 of FIG. 13(a) will in that case have little or no computational burden imposed on it. On the other hand, it is conceivable that another design could have uniform scanning at the camera end which is only transformed into mixed images at the display end with the aid of the magnitude of the eye position signal encoded in a single composite video signal on line 40 or a plurality of equivalent component video signals. Of course, this would be bandwidth wastefull, but nonetheless one of many different possible solutions to the encodement problem. In addition, if the same basic approach as used in the display of FIG. 13(b) is taken in reverse in a camera, the splitters $278_1$, $278_2$, ..., $278_{99}$, $278_{100}$ would have to serve an averaging function for ensuring that each 5×5 coarse picture element is of uniform contrast or luminance. This process is preferably carried out at the camera end but could be done at the display end.

For example, a typical field is scanned first by a coarse field and then, if so designed, by a fine field. Of course, an entire coarse frame may be scanned first, followed by an entire fine frame. By way of example only, a frame is first coarsely scanned, in a coarse field, five lines at a time over the entire surface of the matrix with large (5×5) pixel picture elements except for an 8,000 elemental pixel (100×80 pixels) rectangle which is not scanned coarsely since it is to blocked at the proper position by the signal on line 206. For the scheme described, this means sixteen successive coarse scanning lines are blanked out for twenty successive vertical groups of five coarse pixels each. The frame may then be finely scanned in the next field over the small (100×80) rectangular area blanked out in the previous coarse field. If each of the pixels has an individual capacitor associated with it, this means that the capacitors associated with the coarsely scanned area will have the same charging time as those of the finely scanned area and no special voltage adjustments need be made for one field getting less charging time than the other. This simplifies the matching of the brightness of the fine field to that of the coarse field. Although not described in detail, but as will be understood by those skilled in the art of television engineering, interlacing may be used to eliminate flicker.

A portion of a solid state video camera such as the camera 66 of FIG. 2 is shown without limitation in FIG. 13(c). There, a matrix 286 which may be a CCD, MOST, or other type solid state imaging matrix is scanned coarsely and then finely, as in the display 234 described above in FIG. 13(b), except in the reverse process, by gathering intelligence rather than providing it, in order to produce the image signals on line 86 of FIG. 2, which are ultimately conditioned, encoded, transmitted, decoded and translated into the signals appearing, respectively, on lines 208, 214 of FIG. 13(b). As suggested, unlike the display matrix 234 of FIG. 13(b), the camera matrix 286 of FIG. 13(c) has image information signals flowing from the matrix to the control electronics, i.e., the reverse process. The control elements are similar, playing the same roles except in reverse. The only major exception is one hundred coarse averagers $288_1$, $288_2$, ..., $288_{99}$, $288_{100}$, which are each responsive to image information from twenty-five pixels, each pixel corresponding to one of the twenty-five intersections of five adjacent rows with five adjacent columns in a coarse picture element. The averagers serve the function of averaging the total charge received into an average value for the intersecting five rows and five columns. Thus, the five addressed rows (for each coarsely scanned line) contribute one pixel each to each of the five columns for a total of twenty-five pixels to be averaged in each averager for each coarsely scanned oversized picture element. It is this averaged magnitude which is provided on one hundred signal lines $292_1$, $292_2$, ..., $292_{99}$, $292_{100}$, to blocking gates $296_1$, ..., $296_{100}$. The blocking gates $296_1$, ..., $296_{100}$ will not be needed if blocking gates $272_1$, ..., $272_{100}$ are used in the display of FIG. 13(b). Similarly, if the blocking gates of FIG. 13(c) are used then the blocking gates $272_1$, ..., $272_{100}$ of FIG. 13(b) need not be present. This latter alternative is of course usually preferred for economic reasons due to a large number of displays as opposed to a small number of cameras. It will thus be understood that twenty averagers (a hundred pixels or twenty large picture elements (5×5 pixels) must be blocked out from sixteen coarse horizontal scanning lines during each coarse scanning field. The eighty averaged signals which do get through the blocking gates plus twenty black level signals from the twenty selected gates will be transmitted to a one hundred cell charge transfer device 300 over one hundred signal lines 302, ..., 304. Thus, during sixteen out of the eighty coarse scanning line periods during each coarse field, there will be twenty adjacent black level signals stored somewhere within the 100 cell charge transfer device. These will later be translated into eighty short lines (in groups of five lines) of a hundred "black" level pixels somewhere on the display for fill-in during the fine scanning field. The device 300 provides a coarse image signal on a line 306 which will eventually be represented by the signal 208 in FIG. 13(b); for the moment, however, it is provided over signal line 86 of FIG. 2 to the control 82 for encodement into a composite or component video signal provided on line 88 for transmission to the image space 22. Referring back to FIG. 13(c), it will be understood that the eighty coarse scanning lines are addressed one at a time (actually five rows of pixels at a time) by an eighty line addresser 308 as triggered by coarse row sync pulses on line 310 provided over line 84 by control 82. There are eighty splitters 312, ..., 314 which are used to address eighty corresponding groups of five rows. The fine field of each frame is addressed by an eighty line addresser 316 which simply energizes one row at a time until eighty successived lines have been energized. The addresser 316 is triggered by a control signal on a line 318 which commands the addresser to start addressing at a particualr line out of the four hundred available. Control signal line 318 may also be provided over the signal line 84 of FIG. 2 along with control signals 320, 318, 322. A five hundred by one hundred selection circuit 324 is connected to all five hundred vertical columns but only selects one hundred columns for each of the eighty individually addressed fine lines and provides each 100-pixel line in succession to a one hundred cell charge transfer device 326, as steered from the matrix 286 through the selection circuit 324 by the control signal on line 322. The selection circuit 324 may be similar to the steering circuit 240 of FIG. 13(b) except using multiplexers instead of demultiplexers. A fine field image signal is provided on a line 328 which will eventually become translated into the signal on line 214 of FIG. 13(b).

The format for the video signal on line 40 may, without limitation, assume a format particularly adapted for use in any of the embodiments of the present invention such as disclosed in FIGS. 2, 12 & 13(a) and thus may be selected from a wide variety of alternative formats known in the video art. The format may, for example only, and not by way of limitation, be constructed in a manner similar to that shown in FIGS. 3 & 4 of U.S. Pat. No. 4,513,317 to Ruoff for use in the apparatus 26 of FIG. 2 herein for presenting images constructed in the manner of FIGS. 7(a) & 12. The same approach can be used for the embodiment of FIGS. 13(a), 13(b) and 13(c) except for the modification, without limitation, that the relative time alloted within each field for scanning the high detail area will be equal to that allotted for scanning the low detail area. For the case where the images are presented at various apparent distances, an additional signal is necessary in the period designated T1 of Ruoff for the distance information. This may be accommodated by simply allotting an extra horizontal "line" from period T1 and inserting an analog signal level similar in concept to the Vx and Vy levels shown in FIG. 4 of U.S. Pat. No. 4,513,317. For the stereoscopic embodiment of FIG. 16 herein, alternate fields may be allocated to alternate successive images for alternate presentation to the left and right eyes of the passive viewer. For the multiphonic embodiment disclosed in connection with FIG. 17 below, the audio poirtion of the typical composite video signal is suitably modified (see, e.g., part VI of Television Technology Today, Ed. by T.S. Rzeszewski, IEEE press, 1985) to account for the multiplicity of speakers so that the proper speaker receives the proper signal at the proper time.

Referring now to FIG. 14, a composite video signal waveform 330 is shown without limitation, such as may be formed, again without limitation, in the apparatus 58 of FIG. 2 and used to produce, for example, the display of FIG. 7(b) and as might appear on line 40 of FIG. 2. The video signal may be structurally equivalent to that of commercial television in order to take advantage of at least part of the existing infrastructure, i.e., the broadest network and also videocassette recorders (VCRs). VCR cassettes offer a convenient storage facility for storing video productions made in accordance with the present invention, although the existing cameras and TV receivers are not readily compatible, due to the different scanning requirements. It is, however, not inconceivable that the present invention could be used on conventional TV receivers. This could be accomplished, for example, by using the present level of commercial television resolution for the high detail portion of the image only and deliberately degrading the remaining portion for the low detail resolution areas. Of course, the composite video signal used to implement the present invention need not bear any relation whatever to the structure of the composite video signal presently used in commercial television. That is purely a matter of expedience. And, of course, separate component video signals may be used in lieu of a composite video signal.

The conventional odd 332 and even 334 fields of a single conventional frame are shown. Each field, however, is broken down into four subfields 336, 338, 340, 342 and 344, 346, 348, 350, respectively, each group of four being labelled T1, T2, T3, T4 in the FIGURE. The subfields may be of equal periods or may ber different, depending on the design. A vertical blanking period 352 separates each field. The first subfield (Ti) in each field is used to coarsely "scan" the odd lines from the top of the display to the bottom. Referring back to FIG. 7(b), this would correspond to scanning alternate groups 354, 356, 358 of four arbitrarily designated "odd" lines at a time. Thus, it will be appreciated that the first coarse "odd" line 354 will be made up of the conventional lines 1–4, the second coarse odd line 356 of conventional lines 9–12, the third coarse odd line 358 of conventional lines 17–20, and so on. Thus, if one were to split the standard odd field of 262.5 lines into groups with four adjacent lines in each group, there are now only 65.625 coarse scanning lines in the first quarter of the odd field. Blanking pulses (not shown) of appropriate duratin are inserted between selected horizontal sync pulses in order to blank out coarse scanning in the area of the display where fine scanning is to take place. For example, coarse line 354 is blanked out in the rectangular area covered by lines 360, 362 and also eight of the sixteen pixels for the area centered at 188. The rest of the fine detail area is blanked out in the same relative position between the two horizontal sync pulses marking the beginning and end of the first even coarse scanning line 364. The second subfield (T2) in each field is used to scan the intermediately fine areas by means of four moderately fine short scanning lines 360, 362, 366, 368. Since only a very small portion of the total screen area will be utilized for image information during each subframe T2, it will be appreciated that the short line pairs 360, 362, 366, 368 may be scanned more than once, in fact a large number of times during T2, depending, in the various possible designs, on the number of groups 194 selected to simulate the macula area. In such a case, the relative brightness of the high detail area will be too great in comparison to that of the low detail area unless the intensity of each high detail pixel is adjusted to a lower ointensity level such that the cumulative or integrated intensity over a field, frame or similar interval is the same as for the low detail area. preferably, the relative duration of T2 may be reduced in comparison to the coarse scanning period so as to permit time for only a single scan. The number of groups and the number of times selected for repetitive scanning is of course a design choice, as is the format of FIG. 7(b) itself. The third subfield (T3) in each field is used to coarsely scan the even lines. This means that coarse even lines 364, 370, etc., corresponding to conventional lines 5–8, 13–16, etc., will be scanned during T3. The fourth subfield (T4) in each field is used to individually scan the lines of pixels which make up the central area centered at 188. Since in using this method there are only four lines of four pixels each, these lines may be scanned repeatedly during T4. Since there will be a great many (approximately sixty-six) horizontal sync pulses available, it would be possible to repeatedly scan the pattern a very large number of times. Again, the relative brightness will be too great unless the intensity of the pixels in each area is adjusted in inverse proportion to the number of times scanned in a frame, field or similar period. If the high intensity area is scanned only once, the relative duration of T4 should be reduced accordingly, the scanning speed should be proportionately slowed down with an accompanying current reduction, or the current should be increased to increase the brightness.

It will be understood that the pattern of FIG. 7(b) has been constructed during only one field of a conventional composite video signal, using four separate and interleaved subfields as building blocks. The second conventional field 334 of FIG. 14 is used to construct an entire frame in exactly the same way so that the frame repetition rate is effectively doubled. This is important for removing the flicker effect for low brightness displays and may also be used for the stereoscopic embodiment to be described below where the odd field period is used for left eye images and the even field for right eye images.

It should be understood that a composite signal suitable for use in the display of FIG. 13(b) may be constructed, without limitation, using a similar design strategy except omitting intermediately detailed scanning.

It should also be understood that although not shown in FIG. 14, certain "lines" must be utilized for storing nonimage information such as is shown in period t1 of FIG. 4 of U.S. Pat. No. 4,513,317. These lines may contain not only Vx and Vy information for locating the high detail area but also distance information for magnifying and shifting the image.

Figure 15:
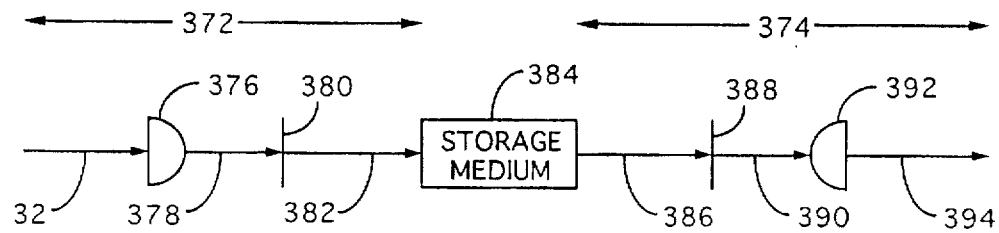
FIG. 15 is an illustration of a means and method of constructing and presenting panoramic mixed images, according to the present invention.

Referring now to FIG. 15, a very simple method and means for constructing (at the camera end 372) and presenting (at the display end 374) panoramic mixed images is shown for purposes only of illustrating one way of presenting such images, and certainly should not be considered as limiting the scope of the invention. A lens 376, such a spherical planoconvex lens in a camera, such as the camera 66 of FIG. 2, is responsive to input light signals such as on line 32 for providing camera image signals on a typical line 378 to a light sensitive surface 380 in the camera. The light sensitive surface provides an encoded image signal on the line 382 to a storage medium 384 such as a broadcast network near simultaneous pickup and display or a VCR for recordal and later playback for providing an output signal on a line 386 to a display surface 388 in a video display which forms optical image signals on a typical line390 to another lens 392 such as a spherical planoconvex lens which provides a typical output optical image signal on a line 394 for a passive viewer's eye. Of course, as mentioned, the encoded image signal need not be stored by a VCR but may be stored on a video disc, be provided directly, or broadcast as in FIG. 2, among other methods. For an embodiment in which accommodation is induced in the passive viewer, a variable magnification means, such as a laterally movable biconvex lens may be interposed between the display 388 and the planoconvex lens 392. Or, the display surface 388 may be movable. of course, other more sophisticated means of providing the desired panoramic effect are also contemplated and are within the scope of the present invention. Only one, very simple approach has been illustrated. For color embodiments, for example, the corrected lenses disclosed in U.S. Pat. No. 4,406,532 may be used. Although this simple method and means is a highly advantageous approach to the problem of presenting panoramic mixed images, it is by no means the only approach possible and should therefore in no way be considered limiting. For instance, the hemispherical images of U.S. Pat. No. 2,719, 457 may in principle be provided.

Figure 16:
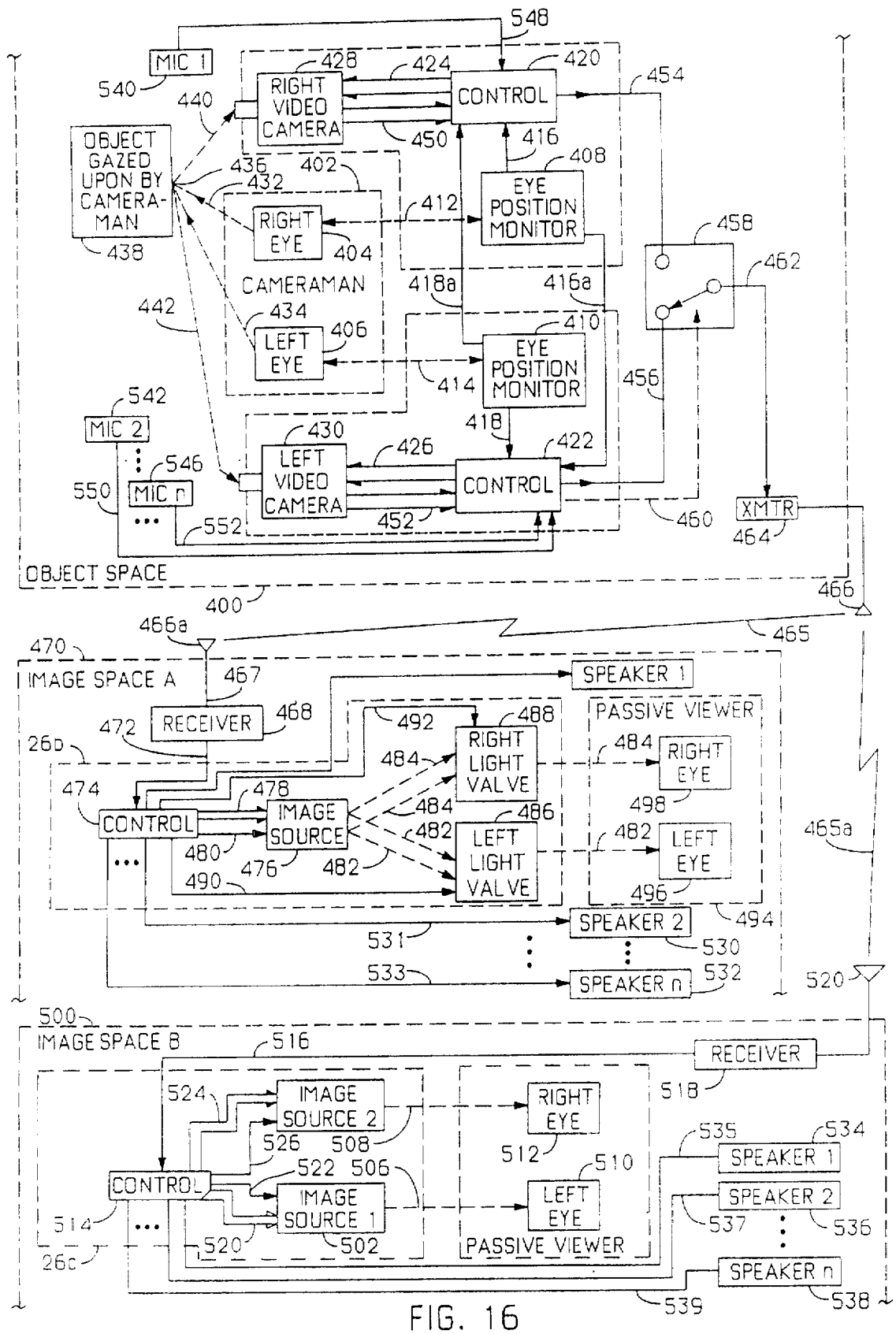
FIG. 16 is a block diagram of a means and method of constructing and presenting stereoscopic mixed images, according to the present invention.

Referring now to FIG. 16, a stereoscopic camera embodiment and two stereoscopic display embodiments of the present invention are there illustrated. An object space 400 contains a cameraman 402 having a right eye 404 and a left eye 406 which are respectively monitored for position by eye position monitors 408, 410 via signal lines 412, 414, each of which may represent more than one signal, e.g., both an infrared illumination beam and an infrared reflection beam, the reflection beam having a magnitude indicative of the monitored eye's angular position. Each eye position monitor provides at least one eye position signal 416, 418 to respective control units 420, 422, which in turn provide scanning control signal lines 424, 426 to respective video cameras 428, 430. The eye position monitors may measure one or more axes of rotation of the eye, i.e., both horizontal and vertical ductions and torsions as well. If torsions are not measured they can be computed or looked up, if desired, based on the point of convergence and torsions that can be predicted according to average human behavior, as stored in a lookup table. The cameraman is, at any given point in time, viewing particular objects within the object space and his visual axes 432, 434 are shown at such a moment in FIG. 16 directed so as to intersect at a point 436 on such an object 438. There will generally be a source of illumination in the object space (not shown) to which the cameras 428, 430 will be sensitive and which will illuminate the objects in the object space, including the point 436, so as to reflect light to the cameras as shown, for example, by light rays or image signals 440, 442. The image information borne by such light rays is encoded in the cameras either by electromechanically rotated optical means (see, e.g., U.S. Pat. No. 3,953,111) or electronically by a suitable nonuniform resolution encodement method such as one of the scanning methods disclosed above. There will of course be a very large number of reflected light rays, other than rays 440, 442 entering each of the cameras from the various points and objects within the object space. If, for example, the cameras of FIG. 16 use electronic raster scanning of a light sensitive surface as the encodement technique, there will be a small number of rays in the vicinity of each of the rays 440, 442 which will be cast on correspondingly small areas on each of the respective light sensitive surfaces. These bundles of rays correspond to a field of view of a few seconds of arc, from the point of view of the cameraman along lines 432, 434. Both of these small areas will be scanned finely in the respective cameras while all of the remainder of the light sensitive surfaces, excited by the remainder of the rays surrounding the small bundles from all points within the cameraman's field of view, will be scanned coarsely. It should be understood that some embodiments (not only stereoscopic embodiments) may have more than just a few seconds of arc scanned finely. Some embodiments may finely scan on the order of minutes or even degrees. In any event, the control signals 424, 426 will control the instantaneous positioning of the finely scanned areas on the respective light sensitive surfaces, according to changes in the directions of the visual axes 432, 434 of the cameraman's eyes. For example, each of the light sensitive surfaces may be laid out in a Cartesian coordinate fashion and each of the control signals 424, 426 will then contain x and y coordinate information. The optical image corresponding to the scene viewed can be thought of as being cast on such a coordinate system such that the positive y direction corresponds to "up" in the scene and positive x to "right." In that case, if the cameraman is gazing at a near object straight ahead and above horizontal, then the signal on the line 426 will cause the fine scan in the left camera to be located in the first quadrant of its light sensitive surface and the signal on the line 424 will cause the fine scan in the right camera to be located in the second quadrant of its light sensitive surface. A change in the cameraman's gaze toward a near object to the far right of the scene below horizontal will cause the fine scan in the left camera to move from quadrant one to quadrant four and the fine scan in the right camera to move from quadrant two to quadrant four.

Each of the cameras 428, 430 provides a video signal, respectively, on lines 450, 452 to the control units 420, 422, where the image information is formatted, without limitation, into composite video signals on lines 454, 456, respectively. Of course, other encodement techniques are equally acceptable, e.g., separate component video signals for carrying information separately relating to deflection, intensity, etc. A switch 458 is controlled by a signal line 460 from the control unit 422 (or control unit 420) to alternate between signal lines 454 and 456 in order to provide each signal alternately on a line 462 to a transmitter 464 for transmission of a broadcast signal on a line 465 via an antenna 466.

The timing of the alternations of switch 458 may be selected so as to provide a left field, frame or portion thereof and then a right counterpart.

An antenna 466a is responsive to the broadcast signal on the line 465 and provides a sensed signal on a line 467 to a receiver 468 in an Image Space A 470 which provides a received signal on a line 472 to a control 474 within an apparatus 26b. The control 474 strips off synchronizing signals from the composite video signal on the line 472 and provides one or more synchronizing signals, e.g., horizontal and vertical, for the deflection system of an image source 476, as signified by a plurality of synchronizing signals on a line 478. The image information is provided on a signal line 480 to the image source 476 which provides alternate left and right eye images as signified by bundles of image signal lines 482, 484, respectively provided to left and right light valves 486, 488. These are in turn controlled by signal lines 490, 492 from the control 474. The left light valve 486 is controlled by signal line 490 to transmit images on lines 482 when the left eye images are presented by image source 476 but to block images on lines 482 when right eye images are presented. Similarly, the right light valve 488 is controlled by signal line 492 to transmit images on lines 484 when the right eye images are presented by image source 476 but to block images on lines 484 when left eye images are presented. A passive viewer 494 may be responsive with a left eye 496 to the transmitted left eye images on lines 482 and with a right eye 498 to the transmitted right eye images on lines 484.

Light valves are not required for anapparatus 26c in Image Space B 500 because two separate image sources 502, 504 provide separate left and right eye images on image lines 506, 508, respectively, provided separately to a passive viewer's left and right eyes 510, 512. A control 514 is responsive to a composite video signal on a line 516 from a receiver 518 supplied by an antenna 520 responsive to a broadcast signal on a line 465a which may be similar to or identical with the signal broadcast on the line 465. The control alternately provides synchronizing and left eye image information signals, respectively, on lines 520, 522, and synchronizing and right eye image information signals, respectively, on lines 524, 526 to the respective image sources 502, 504.

It should be understood that although the apparatus 10c of Image Space B 500 is illustrated as responsive to a single composite video signal which is multiplexed between the two separate image sources 502, 504, so that each source provides images for only half the time, there could as easily be a system which provides two separate composite video signals, one for each image source, so that each source provides images all the time. A dual CRT system which requires two separate video signals which are each always active is shown, for example, in U.S. Pat. No. 4,310,849.

Both image spaces are provided with a number of speakers 530, . . . ,532 energized by audio signal lines 531, . . . ,533 in Image Space A and speakers 534, 536, . . . , 538 in Image Space B energized by audio signals on lines 535, 537, . . . , 539. These speakers are arranged about the head of a passive viewer to simulate sounds "heard" by the simulated active viewer in the object space. FIG. 16(a) shows the passive viewer 494 of FIG. 16 having six separate speakers arranged symmetrically about his head. Three are arranged in a horizontal circle 539a separated from one another by 120 degrees. The speakers may be mounted, along with the display, in a helmet for mounting on the passive viewer's head or may be mounted on external supports independent of the viewer. Three others are arranged in a vertical circle 539b, also separated by 120 degrees. Microphones 540, 542, . . . , 546 are similarly arranged about the head of the cameraman in the object space 400 and pick up sounds for transmission over signal lines 548, 550, . . . , 552 to the control units 420, 422 for inclusion in the composite video signals on the lines 454, 456 in much the same way as conventional television, except on six channels. These may of course be multiplexed into a single channel or more.

Figure 18C:
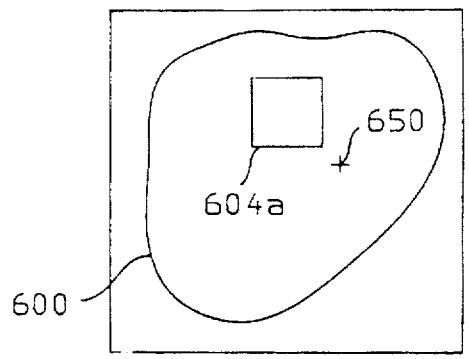
FIG. 18(c) is an illustration of a left monocular field of view of a virtual eye, according to the present invention.
Figure 18D:
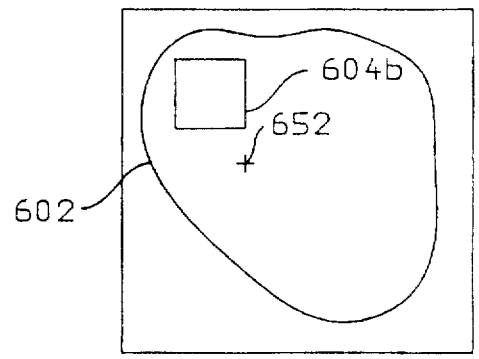
FIG. 18(d) is an illustration of a right monocular field of view of a virtual eye, according to the present invention.
Figure 18A:
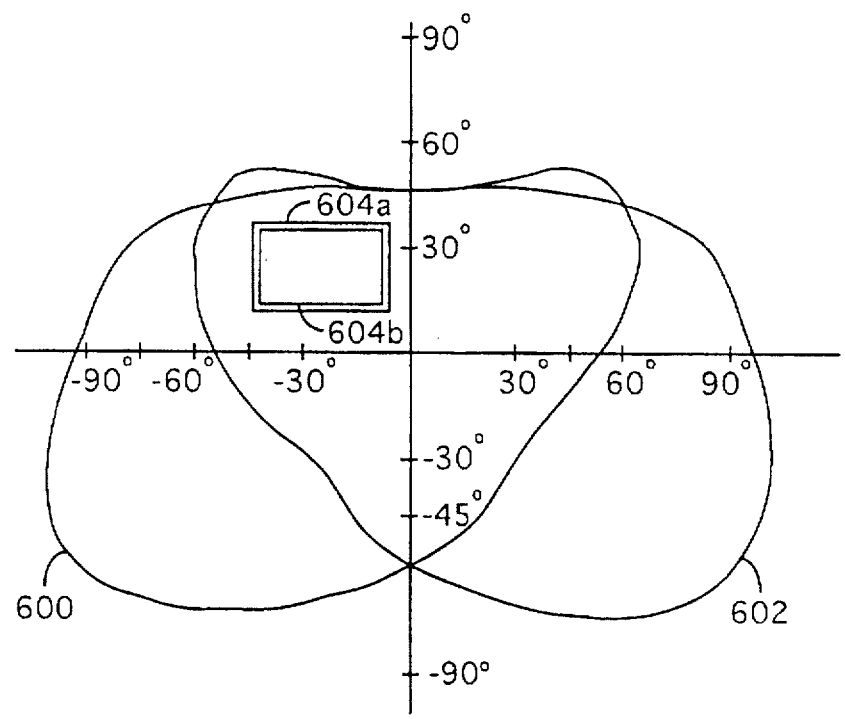
FIG. 18(a) is an illustration of the manner in which the monocular mixed image fields of view of a pair of virtual eyes are perceived binocularly by a passive viewer, according to the present invention.

FIG. 18(a) is an illustration of the manner in which the fields of view of a simulated pair of eyes in the object space, roughly corresponding to those of the cameras 430, 428 or to those of the cameraman's eyes 406, 404 of FIG. 16, are arranged so as to overlap, according to the present invention. A left field of view 600 roughly corresponds to the field of view of camera 430 or the eye 406 while a right field of view 602 roughly corresponds to the field of view of camera 428 or the eye 404. The median line of a simulated pair of eyes perpendicularly intersects the origin of the coordinate system illustrated. The left camera 430 coarsely scans a field of view roughly corresponding to the field of view 600 and the right camera 428 coarsely scans a field of view roughly corresponding to the field of view 602. Depending on the instantaneous magnitudes of the signals on the lines 418, 416 in the object space of FIG. 16, each of the respective cameras 430, 428 will select and then finely scan a small area within the overlapping fields of the two cameras. These two finely scanned small areas will themselves overlap so as to be in registration, for example, for each successive fixation. For example, if the cameraman's instantaneous gaze is directed to a point of regard to his upper left, then the left camera will scan, e.g., a small area 604a in the top center of the field of view 600 while the right camera 428 will scan a small area 604b to the top left of field of view 602 as shown in FIGS. 18(c) and 18(d), respectively. Although the small area 604a is shown as slightly larger than the small area 604b in FIG. 18(a), it will be understood that this was done for illustrative purposes only, in order to enable the reader to distinguish the two overlapping areas in the drawing. Of course, for rapidly changing saccades it will be understood that the two areas may not always instantaneously overlap, but will try to "catch up" with one another when the "target" is acquired and the eyes come to "rest." Although FIG. 18(a) shows a binocular field of vision covering about 105 degrees in a heart shape or an inverted pear shape, it will be understood by those skilled in the art of clinical optics that conjugate version movements of the eyes are only possible over a range of approximately 45 degrees from either side of the primary position. This is the binocular field of fixation, i.e., the region of space containing all points which may be fixated by the mobile eyes, assuming the head remains stationary. It will also be understood that the relative size of the highly detailed image areas in FIG. 18(a), (c) & (d) with respect to that of the lesser detailed area is much larger than it should be if one were trying to faithfully imitate the actual relationship between the area covered by the fovea, or even the macula, with respect to the rest of the retina since the fovea only takes a few seconds of arc. It should be understood that the relative sizes selected for the different areas is a design choice and is not of particular significance for the purposes of determining the scope of the claimed invention.

It should also be understood that the highly detailed areas 604a, 604b may move in tandem with their associated lesser detailed areas 600, 602 or may move independently thereof. The former approach is a closer simulation of the human visual process. If torsions are simulated, for the former approach, both the highly detailed and lesser detailed image areas are rotated in tandem; for the latter, they may be rotated in tandem but need not be.

Figure 18B:
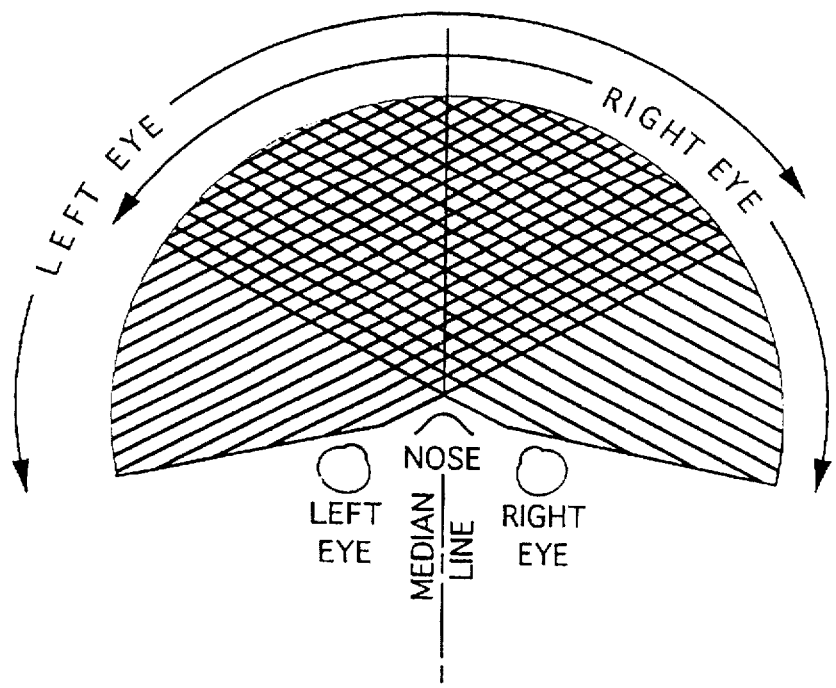
FIG. 18(b) is an illustration of the human binocular horizontal field as seen from above.

FIG. 18(b) illustrates the horizontal field as seen from above. The cross-hatched area represents the binocular field of view. The extent of each of the monocular fields of view is shown. A pair of simulated eyes are illustrated, one on either side of the median line which, as mentioned above, perpendicularly intersects the origin of the coordinate system of FIG. 18(a). It will be observed that the monocular centers of projection are to be dstinguished from the binocular sighting center.

In life, each of the monocular fields 600, 602 of FIG. 18(a) is bounded by the superior and inferior margins of the orbit, the nose, and on the temporal side by the projection of the edge of the retina (the ora serrata; this extends furthest forward in the eye of the nasal side). Accordingly, as shown in FIG. 18(b), each monocular field extends horizontally to about 60 degrees nasally and 100 degrees temporally.

Whenever both foveae are stimulated simultaneously, the stimuli are perceived as having a common origin in space. A similar correspondence exists between the great multitude of other pairs of retinal receptors, called corresponding points which, when stimulated in binocular vision, also give rise to a sensation subjectively localized at a single point. For a given position of the eyes, the locus of all the object points whose images fall on corresponding points is known as a horopter, generally a curved surface. The longitudinal horopter is the line formed by intersection of the horopter with the plane containing the eyes' centers of rotation and the fixation point.

Students of the eye often make use of an imaginary organ called the binoculus or cyclopean eye as an aid for understanding the projection of images in binocular vision. If the longitudinal horopter is made a part of a circle passing through the point of fixation and the eyes' nodal points, the nodal point of the cyclopean eye should be placed on this circle equidistant from the left and right eyes' nodal points. When a point on the left retina is stimulated, it is conceived as stimulating a point on the cyclopean retina at the same distance and in the same direction from its fovea. The same applies to a point on the right retina. If the right and left receptors under consideration are corresponding points, they coincide when transferred to the cyclopean eye where they are said to give rise to a single percept by projection through the cyclopean nodal point. The positioning and overlapping of the monocular fields 600, 602 (each field presented only to one of the passive viewer's eyes) of FIG. 18(a) and the registration of the high detail image areas 604a, 604b are carried out such that a cyclopean eye positioned with its primary line perpendicular to the plane of FIG. 18(a) and intersecting the origin of the illustrated coordinate system would have all of the points within the overlapping portions of the fields 600, 602 perceived as corresponding pairs of points.

To digress for a moment, as an active observor moves his body about in an object space, his head and hence the fields of view will move about along with his body. For example, if the active observor walks straight ahead for a period of time his head may be kept erect and remain facing straight ahead or it may from time to time be turned in any direction. His eyes may at the same time fixate on various objects in the object space. Under a circumstance of keeping the head aligned straight ahead with respect to the shoulders, the image content of the monocular fields of view will remain approximately the same, ignoring effects due to the rocking motion of walking and the monocular field losses accompanying extreme versions of the margins of the binocular field of view.

For the case where the head is rotated to one side as the active observor moves along, the head movement will change the image content of the monocular fields of view. According to the present invention, there are at least two ways of simulating such movements. First, a pair of non-linear lenses such as disclosed by Fischer et al in U.S. Pat. No. 3,953,111 may be used in the cameras 428, 430 of FIG. 16, each camera or lens mounted on a two degree of freedom platform for rotation about horizontal and vertical axes in a "Listing's plane" (a plane through the eye's center of rotation, perpendicular to the primary line of the eye) for each simulated eye or, in the approximate case, for each camera. The lenses are fitted with artificial boundaries corresponding to those of the orbit and nose which are stationary with respect to the cameraman's head. In this way, the highly detailed and lesser detailed image areas change their image content together. They stick together, as in life.

A second way is to change the image content of the lesser detailed area to simulate head movements only, while the highly detailed image area is free to move about independently of the lesser detailed image area to simulated ductions. This approach can be done wholly electronically, by moving the position of the highly detailed small scan area within the lesser detailed area.

Figure 17:
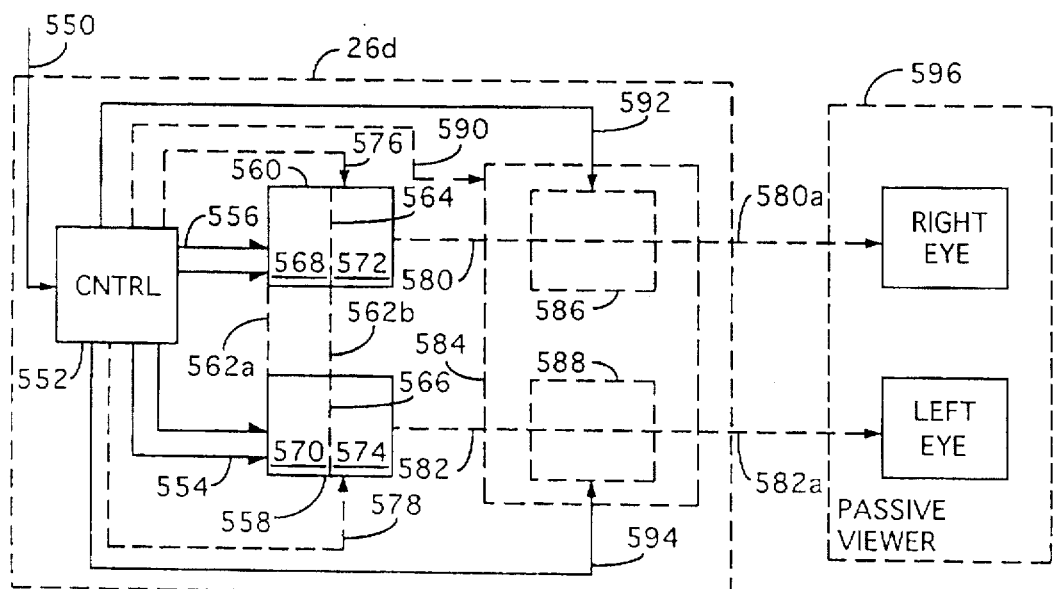
FIG. 17 is a block diagram of a means and method for presenting stereoscopic mixed images at various apparent distances, according to the present invention.

FIG. 17 is an illustration of an apparatus 10d, according to the present invention, which apparatus may be similar to the apparatus 10a or 10b of FIG. 16 except that it contains means for presenting images at various apparent distances, as in FIG. 3. A composite video signal on a line 550, which may be similar to either the signal on line 472 in Image Space A or on line 516 in Image Space B of FIG. 16, is provided to a control unit 552, which may be similar to the control 474 or 514 of FIG. 16. The control unit 552 provides a number of left eye signals including synchronizing and image information signals on a multiple signal line 554 to a left eye image source 558 (solid lines) and a number of right eye signals including synchronizing and image information signals on a multiple signal line 556 to a right eye image source 560 (also in solid lines). Actually, the image sources 558, 560 may be either separate left and right image sources as shown in solid lines forming the rectangular blocks 558, 560 (similar to Image Sources 1 & 2 (502, 504) of FIG. 16) or may be a single image source as shown in the left half of each of the solid boxes 558, 560 by broken lines 562a, 562b, 564, 566 (similar to the Image Source 476 of FIG. 16) made up of combined units 568, 570. In that case, light valves 572, 574 are provided, as in Image Space A of FIG. 16. These would be controlled by signals on lines 576, 578 as in signal lines 492, 490 of FIG. 16.

In either event, right and left eye images on image signal lines 580, 582 are provided to either a single means 584 or separate left and right means 586, 588 for presenting images at various apparent distances. The single means 584 is controlled by a control signal on a line 590 from the control unit 552. The separate means 586, 588 are controlled by separate control lines 592, 594 from the control means 552.

Also in either event, the images carried by the image signal lines 580, 582 are altered into images at various apparent distances, as represented by image signal lines 580a, 582a, and are presented, respectively, to the left and right eyes of a passive viewer 596.

The viewing of a distant object, e.g., along the visual axis of a cyclopean eye in its primary position is simulated, according to the present invention, as shown in FIGS. 18(c) & 18(d) by centering the high detail image areas 604a, 604b at points 650, 652, corresponding to the intersection of the left and right eyes' visual axes at the point of fixation such that points 650 652 overlap on the origin of the coordinate system of FIG. 18(a).

The visual apparatus is frequently engaged in the acquisition of detailed binocular near object information. The fusion reflex directs the eyes' visual axes so that a near object of regard is simultaneously imaged on both foveae. The closest point in the median plane to which the eyes can converge is the near point of convergence which varies among normal individuals between 40 to 160 mm from the corneal plane.

The angle of convergence (C) for a near object is usually measured in prism diopters according to the approximate relation $C=-Q \times pD$, where Q is the inverse of the distance (q) of the object (in meters) and pD is the interocular distance (in cm). (A prism diopter ($\Delta$) is a unit for measuring deviation. One prism diopter is that strength of prism that will deflect a ray of light 1 cm at a distance of 1 meter. The deflection is toward the base of the prism. Another commonly used unit, a degree (°), equals about 2Δ). For example, given that q=−250 mm and the pD is 60 mm, C=4×6=24 diopters. Accommodation is measured in diopters, i.e., the inverse of the distance in meters from the eye. The range of accommodation is the linear distance from the far point to the near point. For example, an eye with 8D of accommodation has a near point of −⅛ meter or −125 mm, so its range is from infinity to −125 mm.

Figure 19:
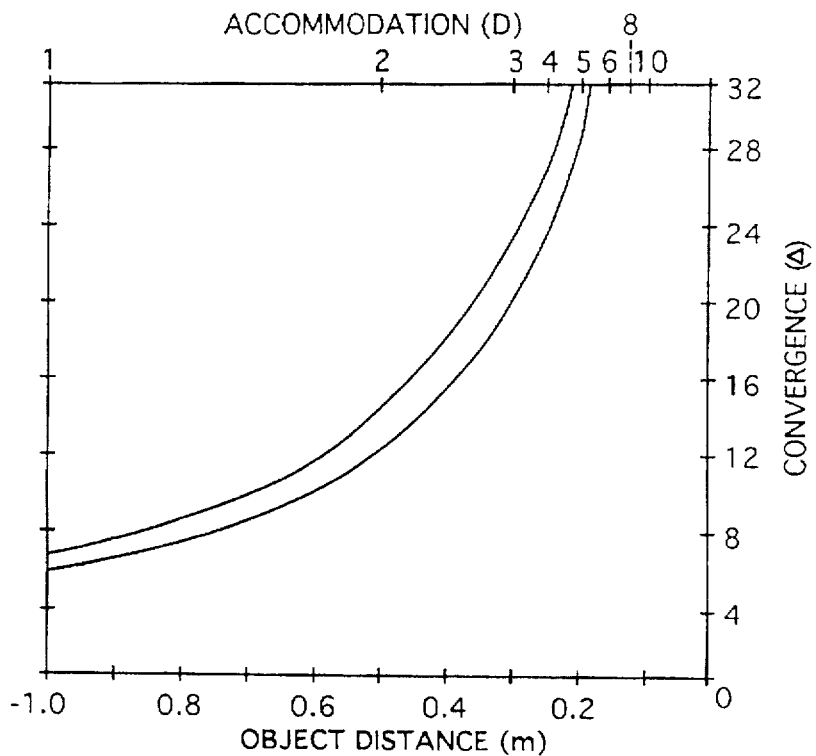
FIG. 19 is an illustration of the relationship between accommodation and convergence for two normal interocular distances.

FIG. 19 illustrates the theoretical relation between accommodation and convergence as the object of regard approaches the eye. The required convergence is plotted in prism diopters for two different interocular distances 654, 656 corresponding to 70 and 60 mm, respectively. A separate scale at the top of the graph, to be read directly against the object distance, gives the necessary accommodation.

Various stereoscopic viewing techniques and devices are known. These range from the well known Wheatstone, Brewster and Brewster-Holmes stereoscopes to the lesser known Asher-Law stereoscope. Various types of Synoptophores (a much modified Wheatstone stereoscope) are also known, as is the variable prism stereoscope (using rotary or Risley prisms). The apparati 10a, 10b of FIG. 16 in Image Spaces A & B, respectively, are amenable for use in any of the aforementioned stereoscopic viewing devices, without limitation, for presenting the monocular fields 600, 602 of FIG. 18(a) so as to present corresponding points accurately and, if desired, to preserve a normal relationship between accommodation and convergence in a passive viewer. In both apparati 10a & 10b, the crosses 650, 652 of FIG. 18(c) & 18(d) are optically lined up with the eyes of the passive viewer in their primary positions, i.e., the left eye's axis perpendicularly intersecting the plane of FIG. 18(c) at crosspoint 604a and the right eye's axis similarly intersecting crosspoint 652 in FIG. 18(d). The actual physical positioning of the fields 600, 602 on the display surface of source 476 or surfaces of sources 502, 504 is such that they produce an overlap such as is suggested in FIG. 18(a) and such as would be produced in a cyclopean eye. For the simple case in which the accommodation of the passive viewer's eyes is not actively stimulated to change, the normal setup of one or some combination of the known stereoscopic devices, without limitation, may be used without modification, except as described above as necessary to ensure the desired overlap and registration of highly detailed areas.

For the case where accommodation changes are actively stimulated in the passive viewer, as shown in FIG. 17, it is in many cases desirable to preserve a normal relationship between accommodation and convergence such as one of the two relations shown, without limitation, in FIG. 19. This may be achieved in any of the stereoscopes described, or others, using the basic idea of the Asher-Law stereoscope or variations thereof as taught in connection with FIGS. 20, 21 & 22. The basic idea of the Asher-Law stereoscope is to control the convergence/accommodation ratio by separating the two halves of the stereopair, mounting each half on its own adjustably angled rail and varying their separation to a predetermined degree as the viewing distance, which can be kept the same for each eye, is altered. It should be understood that although this principle will be described in detail in connection with the stereoscope of FIG. 20, there are many other approaches for achieving the same end. For example, instead of altering the distance of the stereopair from the passive viewer's eyes (similar to the approach of FIG. 5(d), a variable magnification lens (similar to FIGS. 5(a) & (b)) or a Risley (rotary) prism (see FIG. 21) or a variable magnification lens as shown in FIGS. 21A–J, among others, could be employed to the same end with either lateral displacement of the two halves of the stereopair only or rotatable mirrors to effect lateral displacement of the images thereof, or both. Lateral displacement could also be effected wholly electronically by providing an oversized matrix display and only utilizing a portion of the display surface at any given time. Images may then be shifted left or right by varying amounts to provide the required lateral displacement (see FIG. 22). Similarly, all of the other types of stereoscopes are readily adaptable to control the accommodation/convergence ratio and the claims of the present invention embraces all such techniques for achieving the same end in connection with the disclosed means and method for presenting simulated active percepts for passive perception.

The rotary or Risley prism (known in France as the Cretes and in Germany as the Herschel prism) referred to above is made up of two plano prisms of equal power mounted almost in contact in a carrier. It produces continuously variable prism power according to the principle illustrated in FIG. 21. The prisms are shown side by side instead of superimposed for clarity in both FIGS. 21 (a) & (b). In the zero setting (FIG. 21(a)), the prisms have their bases opposed. To obtain a desired prism power, the prisms are mechanically rotated in opposite directions through an equal angle theta. In the position shown in FIG. 21(b), one prism has its base up and to the left, while the base of the other is down and to the left. The vertical components cancel out but the horizontal ones are additive, giving a resultant (always perpendicular to the zero setting) with its base to the left. If the power of each of the single prisms is denoted by p, it can be seen from the diagram that the total power of the resultant prism is simply 2Psin(theta). Had the initial rotations been reversed in direction, the resultant would have been the same but with its base to the right.

The known variable prism stereoscope incorporates two Risley prisms, so geared that equal amounts of base-in or base-out prism can be placed before each eye. A total of 60 prism diopters is thus available. A septum is usually positioned so as to prevent either eye from seeing the opposite half of the stereogram but, according to the present invention, this may be handled by means of light valves, as described above. Also, to permit a normal relation between accommodation and convergence, a base-out prism should be placed before each eye. Otherwise, instead of converging to a point in the plane of the surface of the stereogram, each eye might have to diverge in order to fixate a pair of corresponding points. If, for example, the separation of these points is 7 cm and the viewing distance is ⅓ m, the total base-out prism required is 21 prism diopters.

Figure 20:
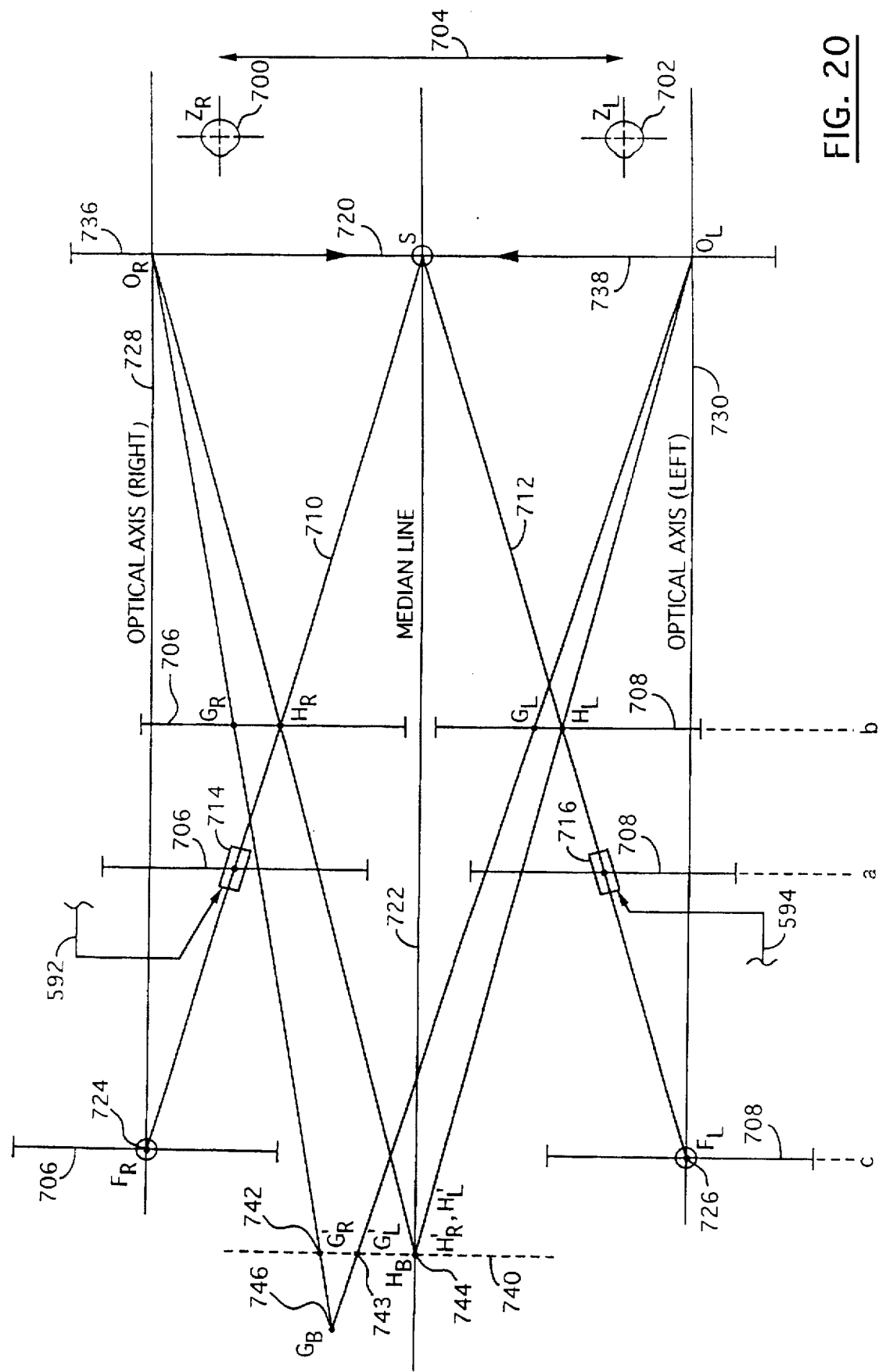
FIG. 20 is an illustration of a Brewster-Holmes stereoscope adapted, according to the present invention, for presenting successive mixed images in a manner which provides for a substantially constant accommodation/convergence ratio.
Figure 26:
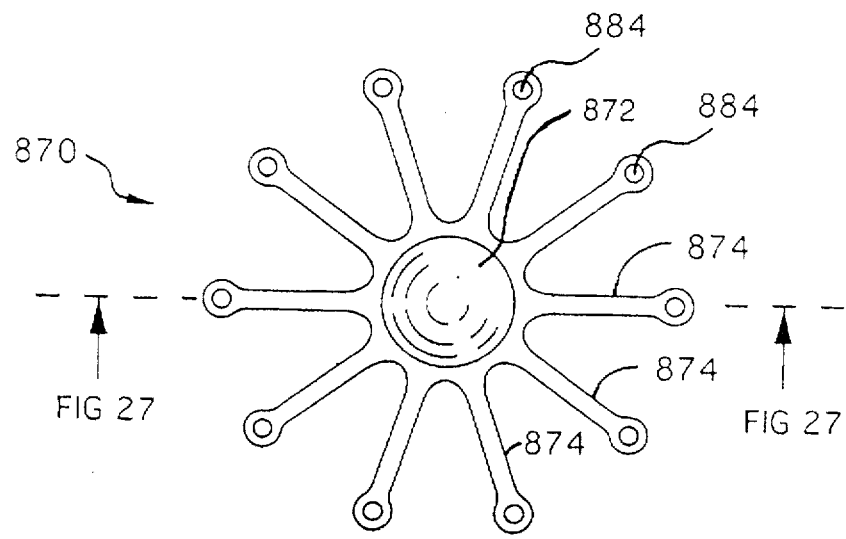

Referring now to FIG. 20 (not to scale), a passive viewer's eyes 700, 702 are separated by an interocular distance 704 and are presented with a stereopair 706, 708, shown in three separate arbitrary positions (a,b,c), each half of the stereopair mounted on an angled rail 710, 712 for movement thereon via a pair of sleds 714, 716 controlled by a corresponding pair of control signals 592, 594 from e.g., the control 552 of FIG. 17. Each half of the stereopair is presented to a corresponding eye of the passive viewer through a fixed lens, e.g., a centered collimating lens (Brewster's lenticular stereoscope) or a decentered (outwards) sphero-prism (Brewster-Holmes stereoscope), the right eye 700 being presented with the right half 706 and the left eye 702 being presented with the left half 708. Each rail coincides with a line drawn from the intersection of the lens plane 720 with a median line 722 to each focal point 724, 726 on the respective optical axes 728, 730.

If the convergence/accommodation ratio is to be kept approximately fixed at its normal value of one half the interocular distance regardless of the distance of the stereopair from the lens plane, both right and left halves of the stereopair must be imaged on the median line or at equal distances to the same side of it. Thus, for a position of the stereopair at b where the points (GR,GL) and (HR,HL) are two pairs of corresponding points, GR and HR are imaged by the right lens 736 in an image plane 740 at points 742, 744, respectively, while GL and HL are imaged by the left lens 738, at points 743, 744, respectively. Rays are shown graphically from the optical center of each lens through the two pairs of corresponding points and on to the image plane. It will be noted that the normal convergence/accommodation ratio is preserved for the fixation point 744 while it will be correct also for a fixation point 746 if certain other conditions relating to the verisimilitude of perspective are met. I.e., the correct angular relationship may be maintained by making the lateral separation of the cameras equal to that of the passive viewer's interocular distance and ensuring that the magnification (m) of the images satisfy the relation m=focal length of stereoscope lens/focal length of camera lens. A third position (c) of the stereopair is shown for the case of a distant object.

In further accord with this aspect of the present invention, the rails of FIG. 20 may be eliminated by using a variable magnification lens in conjunction with either an oversized matrix such as is shown in FIG. 22 or a pair of base-out Risley prisms. By simply shifting the positions of the left and right fields of view on the oversized matrix as shown by the solid lined fields shifted in tandem to the dashed lined positions in FIG. 22 or by varying the deflection power of a pair of Risley prisms in tandem, the Asher-Law accommodation-convergence preservative effect may be achieved using more convenient means.

As mentioned previously, the present invention may be used in a wide variety of embodiments, but generally the embodiments will fall within one or the other of the classes of either single viewer embodiments or multiple viewer embodiments.

A single viewer embodiment is shown in FIG. 23 wherein a passive viewer 800 is illustrated wearing a helmet 802 having at least one image source 804 mounted therein. Additionally, in accodance with the third aspect of the present invention, a plurality of audio sources 806, 808, 810 are mounted at various points in an x-z plane such as shown in FIG. 16(a), and a second plurality of audio sources 812, 814, 816 are mounted at various points in an x-y plane such as also shown in FIG. 16(a) so as to achieve the desired all-around audio effect. The helmet in the embodiment of FIG. 23 need not necessarily have the form shown but may take on a wide variety of forms including the form suggested in U.S. Pat. No. 4,636,866, without limitation. In that case it might be necessary to confine the speakers to a hemisphere situated above the x-y plane of FIG. 16(a). It is even conceivable that a display according to the invention could be mounted in a pair of goggles. In that case, without limitation to that case, the speakers may be separate from the goggles such as in the form of a separate headset or speakers mounted at a point distant from the passive viewer, so as to allow others to listen also, as in a theater environment.

Camera embodiments (not shown) may take corresponding forms including one which utilizes a helmet with two miniature cameras mounted in or on the helmet with a corresponding plurality of microphones similarly positioned about the cameraman's head for picking up sounds in a directional manner from a plurality of directions, according to the design of choice.

Two alternative embodiments of the single viewer helmet of FIG. 23 are shown in FIGS. 24 & 25. These correspond, respectively, to the single and double image source embodiments shown in image spaces A & B of FIG. 16 and are suggested by FIGS. 3 & 4 of U.S. Pat. No. 4,636,866 (Hattori). In FIG. 24, a light transmissive liquid crystal display 820 is mounted in a helmet 802a and provides images to a prism 822 which transmits a 50% reduced intensity image to each of two reflective mirrors 824, 826 for providing the reduced intensity images to each of a passive viewer's eyes 828, 830, respectively. Each of the two groups of reduced intensity images passes through a separate three layer "sandwich" comprising a light valve 832, 834, a variable magnification lens 836, 838, and a Risley prism 840, 842. Of course, the two groups of sandwiched elements 832, 836, 840 and 834, 838, 842 need not be sandwiched to achieve the desired effect, nor need they be interposed in the light path in the manner or order shown. In fact, for simpler embodiments, the Risley prisms and even the variable magnification lenses may be omitted. Electronic controllers 844, 846 correspond to the control 474 in image space A of FIG. 16.

The embodiment of FIG. 25 is similar to that of FIG. 24 except that it corresponds to the dual image source model shown in image space B of FIG. 16. It has a pair of transmissive LCD image sources 850, 852, a pair of variable magnification lenses 854, 856, and a pair of Risley prisms 858, 860 separately sandwiched, one sandwich for each eye. As before, the components 850, 854, 858 and 852, 856, 860 need not be sandwiched, nor need they be interposed in the exact order shown. And, for simpler embodiments, the variable magnification lenses and the Risley prisms may be omitted. In that case, the embodiment of FIG. 25 would be similar to that of FIG. 4 of Hattori, including the fixed magnification lens 184, except for the nonuniform resolution image aspect of the present invention. A similar case would exist with respect to FIG. 24 herein and FIG. 2 of Hattori.

Figure 27:
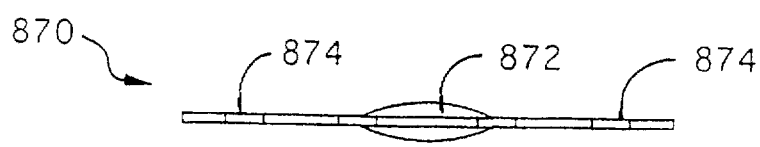
Figure 28:
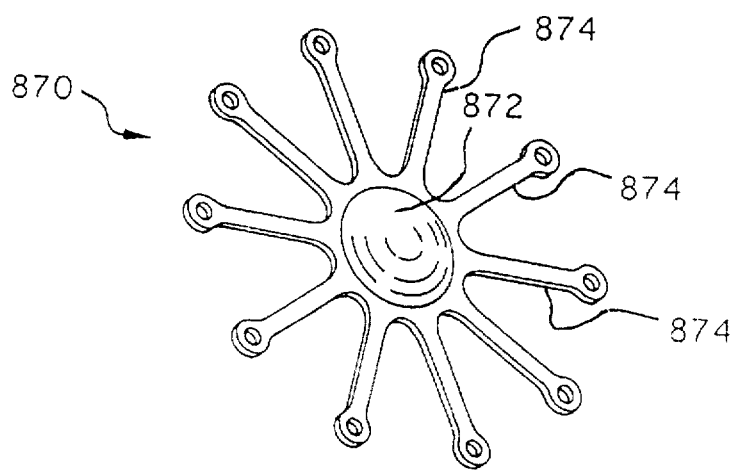

FIGS. 26–35 illustrate still another variable magnification lens, according to the present invention. FIG. 25 shows a lens 870 having a central thin lens section 872 which is flexible and which may, for example, have a radius of 5 mm. The lens 872 may be made of an ethylene-propylene-diene terpolymer vulcanizate such as disclosed in US Pat. No. 4,603,158. The central thin lens section 872 may be stretched thinner by means of a plurality of legs 874 which radiate out from the edge of the central thin lens the outer extent of which describe a circle having a radius, for example, of 15 mm. The legs may be integral to the central lens and made of the same material or may be attached thereto and may be of different material. The central thin lens 872 is shown in FIG. 27 in a relaxed state with maximum thickness, for example of 2.6 mm and with a leg thickness of 0.825 mm. FIG. 28 shows a perspective view. Of course, other means may be used to stretch the lens. The plural leg method is merely one such means.

Figure 29:
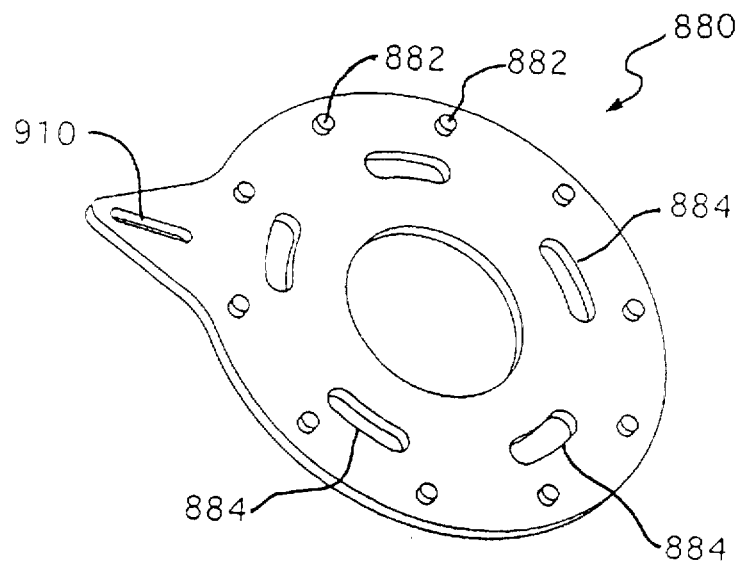
Figure 30:
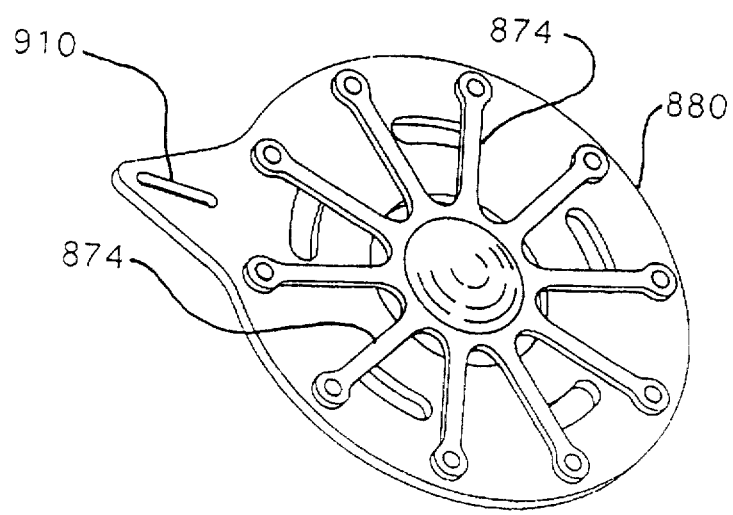
Figure 31:
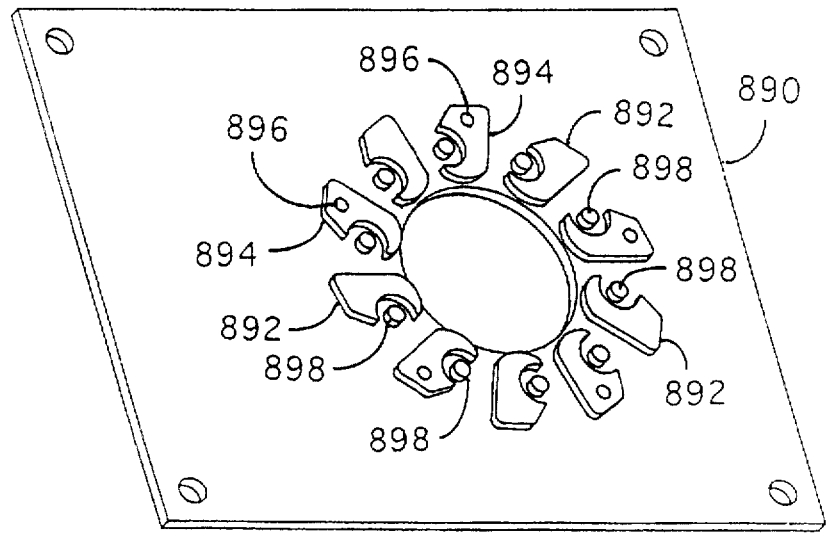
Figure 32:
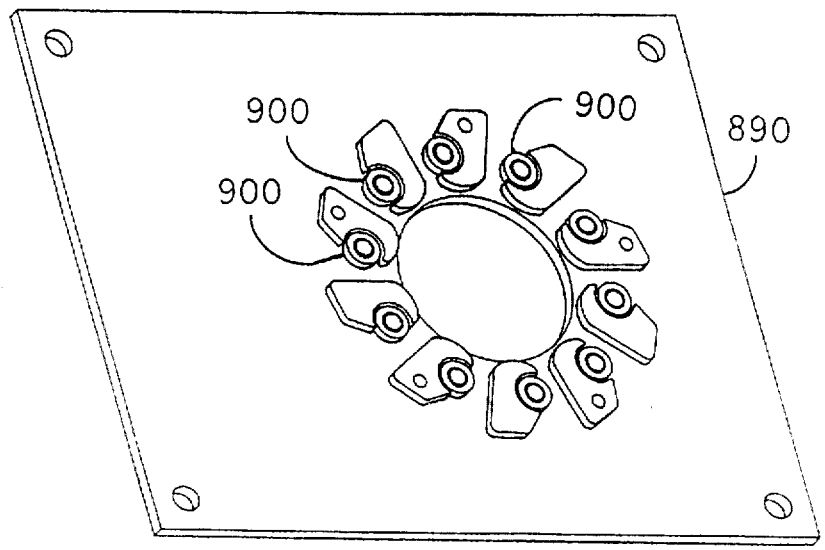
Figure 34:
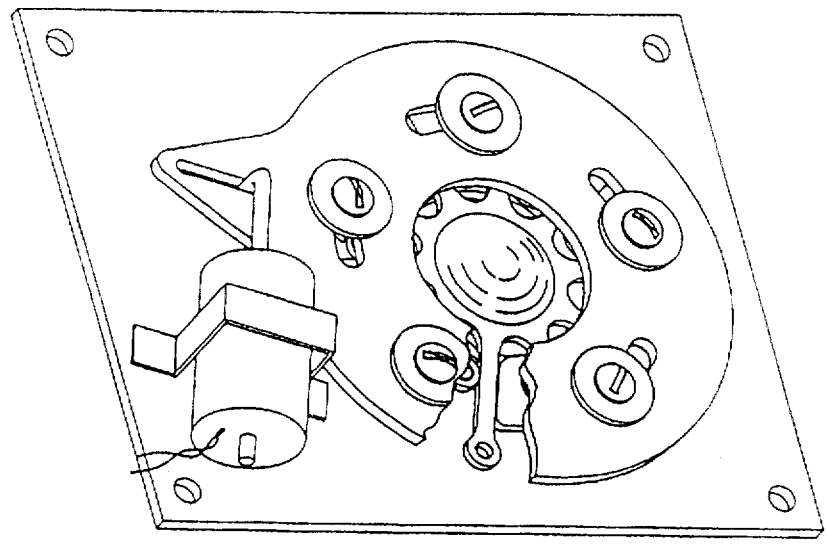
Figure 35:
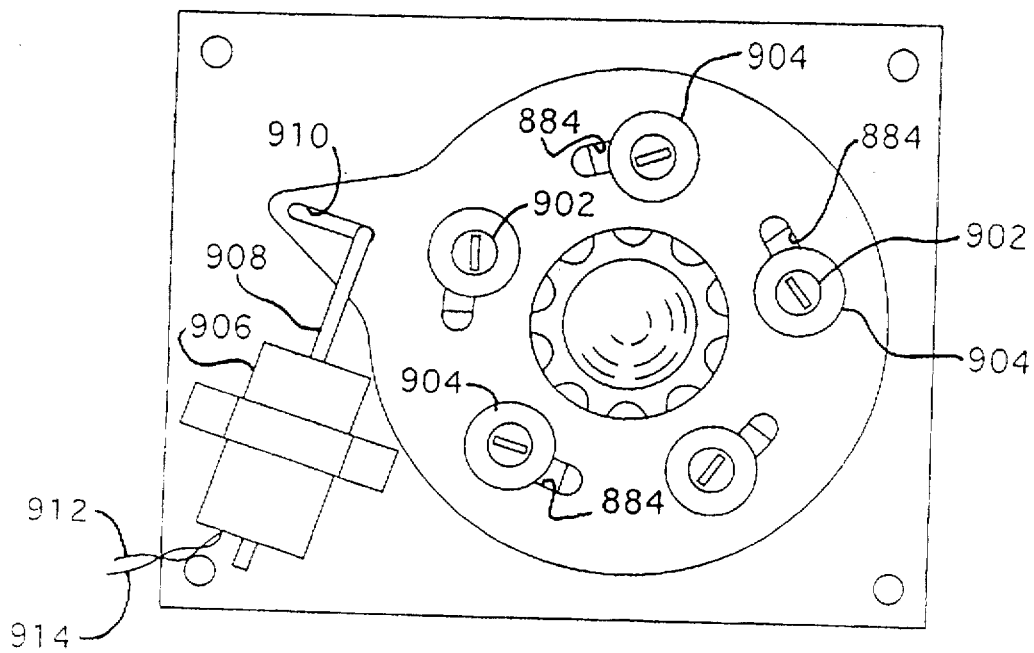

FIG. 29 shows a plate for mounting the lens 870 on pins 882 as shown in FIG. 30. Through holes 884 at the end of each leg are placed over the pins. A plurality of slots 884 in the plate are used to pass fastening means for attaching the plate 880 to means for stretching the legs such as shown in FIGS. 31 and 32 while at the same time allowing rotational motion therebetween. FIG. 31 shows a plate 890 which may be machined or formed as desired, e.g., from one piece of metal. The plate 890 may be used as a base plate and the plate 880 as a rotating plate which may rest on a plurality of hook-shaped bosses 892, some 894 of which may have holes 896 therein for receiving the fastening means that pass through the slots 884. Each of the hooked bosses has a post 898 associated therewith for mounting a roller. A plurality of such rollers 900 are shown in FIG. 32. The rotating plate 880 is mounted on the stationary plate 890 as shown in FIG. 33 and the legs 874 are threaded in between the bosses for rolling contact with the rollers. FIGS. 34 and 35 show perspective and plan views of an assembly including a plurality of screws 902 and washers 904 that hold the rotating plate to the base plate. The screws pass through the slots 884 and may be screwed into threaded holes 896 in the bosses. Bushings may be provided on the screws that allow the screws to be tightened but that won't clamp down on the rotating plate. The rotating plate may be actuated by a linear actuator having a reciprocating piston 908 attached with a sliding coupling to a slot 910 in the rotating plate. The actuator may be mounted to the baseplate and may have its position controlled by signal lines 912, 914.

For the embodiment shown, the legs 874 are separated by 36 degrees and the maximum rotation of the rotating plate 880 is about 25 degrees. This will allow the central lens 872 to be stretched from its relaxed position to achieve a uniform thinning or flattening of the lens whereby its radius is extended anywhere from 5 to 7 mm by the action of the actuator causing the rotating plate to rotate on the stationary baseplate thereby causing the legs to roll on the rollers as they a pulled and stretched in such a way as to uniformity pull on the lens edge from all directions. It will of course be realized that the numerical values given for measurements are merely by way of example. It should also be realized that many other ways can be used to stretch such an optically clear elastomer, according to the teachings hereof.

The second class of embodiment for the present invention is that including embodiments showing images for more than one passive viewer at once. These will not be described in detail except to suggest embodiments along the lines suggested by U.S. Pat. Nos. 4,427,274 (Pund et al) and 4,514,347 (Reed) and PCT application WO 86/01310 except using TV projection for projecting hemispherical stereograms and except having the passive viewers wearing special stereoscopic effect glasses such as, without limitation, those shown in U.S. Pat. No. 4,424,529. The type of glasses used depends entirely on the nature of the image, as generally known in the arts, for example, of polarized or color differentiated stereograms. The passive viewers are situated relatively close together in a small area or volume confined to a size roughly corresponding to the cockpit 6 shown in U.S. Pat. No. 4,515,450 (Arrazola).

Although the invention has been shown with stereopairs using the same surface and using different surfaces separated horizontally, it will be understood that presentations of stereopairs in other ways, such as are suggested in U.S. Pat. Nos. 4,429,328 (Jones, Jr., et al) and 4,523,226 (Lipton et al) are within the scope of the present invention.

Similarly, although the invention has been shown and described with respect to a best mode embodiment thereof, it should be understood by those skilled in the art that various changes, omissions and deletions in the form and detail of the foregoing may be made therein without departing from the spirit and scope of the invention.

Appendix

The human visual apparatus comprises a pair of eyes in the form of globes, each of about 24 mm in diameter. Each may be thought of as a signal converter, similar to a video camera, having means responsive to light rays or signals in an object space for conversion by means of a -lens to optical images or image signals, each globe having a light sensitive surface responsive to the optical image signals for conversion to electrical image signals at an output thereof.

Emerging from the white at the eye's entrance is the transparent tissue of the cornea for bending incoming light through a clear fluid called the aqueous humor and through an opening in the iris called the pupil. The light then passes through the crystalline lens, which focuses an optical image cast on the retina. Before reaching the retina the light passes through the vitreous humor, a jellylike substance which more or less prevents further bending of the light as it exits the lens. The pupil changes in size according, among other causes, to changes in luminance, in order to regulate the intensity of the light which is cast on the retina.

The cornea is a meniscus structure with an anterior radius of curvature of 7.7 mm and a posterior curvature of 6.8 mm. It bulges slightly upward from the surface of the white of the eye, like a watch crystal. It is about 12 mm in diameter and 0.5–0.6 mm thick at the center. It is highly transparent and has an index of refraction of 1.376. It causes the first and largest bending or refraction of all of the eye's refracting elements. The light rays emerging from the back of the cornea have thus been bent sharply inward toward each other.

In this more tightly clustered condition they emerge into an anterior chamber filled with a colorless liquid (again, the aqueous humor) lying behind the cornea and in front of the iris and crystalline lens. As mentioned, the aqueous humor is virtually colorless and is closely matched to the cornea in refractive power. Thus, the direction of the converging rays are essentially unchanged in the aqueous humor. The distance from the posterior surface of the cornea to the crystalline lens is about 3 mm.

The crystalline lens provides a certain degree of refractive power for the eye and also provides the mechanism for focusing at various distances, called accommodation. The lens is biconvex, has a diameter of about 9 mm and has a thickness at the center of about 3.6 mm in the unaccommodated state. It is highly elastic and is suspended from its periphery by ligaments attached to a ciliary body for controlling the curvature of its surfaces by means of the ciliary muscle varying the tension on the ligaments. The radii of curvature of the anterior and posterior surfaces are, respectively, 10 mm and −6 mm, for the unaccommodated state (ciliary muscle relaxed, suspensory ligaments at their greatest tautness and the lens surfaces assuming their flattest curvatures) for viewing far objects. With the introduction of accommodation, both lens surfaces, but especially the anterior, become more steeply curved and the thickness increases for viewing near objects. As mentioned above, the posterior surface of the lens is in contact with the vitreous humor, a transparent gel which fills the posterior of the globe. The index of refraction of the vitreous humor is about the same as the aqueous humor. The index of refraction of the lens is nonuniform, being higher (about 1.40) near the nucleus and lower (about 1.375) near the outer surfaces, resulting in a power greater than it would have if its refractive index were uniform.

The retina is anatomically an outgrowth of the brain and forms a thin, but intricately structured lining of the posterior portion of the globe. optically speaking, the retina is akin to a spherical projection screen (radius of curvature of about −12 mm) upon which optical images are cast. Retinal receptors are stimulated by light and transmit impulses across the retinal surface via nerve fibers and exit the eye via the optic nerve trunk on their way to the cortex. There is of course an orderly arrangement of receptors in the retina, together with its connections to the cortex. The retina's ability to sense image detail, however, is nonuniform over its surface and reaches a maximum in the macular region. This is approximately circular area of about 1.5 mm containing a smaller central area, the fovea centralis (about 0.3 mm horizontally by 0.2 mm vertically), populated exclusively by retinal cones. It is at the fovea that the eye attains its maximum resolving power. When an object engages visual attention, the eye is instinctively turned so that the image lies on the fovea. The optical axis of the eye does not, as might be expected, exactly intersect the fovea. A "visual axis," distinct from the optical axis is therefore postulated as coinciding with the chief ray of the pencil of rays which enters the pupil and is converged to the fovea. The visual axis is normally displaced nasally about 5 degrees and upwardly about 2 degrees from the optical axis. Although the axial terms "optical" and "visual" are distinct, they are used interchangably herein.

From the foregoing it will be understood that parts of the eye, i.e., the cornea, aqueous humor, iris, lens and vitreous humor, cooperate to form optical images or "image signals" which are cast on the retina for nonuniform detail conversion or encodement to electrical signal impulses for transmission to the brain via the optic nerve. There, percepts of the object space represented by the optical images are formed.

The monocular field of view of each eye extends horizontally through more than 90 degrees from the optical axis on the temporal side. The nose, brow and cheek limit the monocular field of view in other directions, so that its shape is irregular.

The primary position of each eye is looking straight ahead at a distant object with head and shoulders erect. The eye is approximately spherical and its movements are akin to those of a ball and socket joint. Rotations of an eye from the primary position are called ductions. Ductions are defined as rotations about either a horizontal or vertical axis in a vertical plane in the head passing through the center of rotation of each eye and normal to the visual axis of the eye in its primary position. Ductions thus represent secondary eye positions. The visual axis, the horizontal axis and the vertical axis intersect at the center of rotation. Elevation of the visual axis is called supraduction and moves the cornea upwards. Depression or infraduction moves the cornea downwards. Abduction and adduction are, respectively, movement of an eye away from and toward the nose. A tertiary eye position is a combination of a horizontal and a vertical rotation and results in an oblique direction of gaze, for example, up and to the left.

Version is movement of both eyes in a similar direction, e.g., while maintaining binocular fixation on an object moving in a front-to-parallel plane (a vertical plane parallel to the vertical plane in the head, described above). Dextroversion is a movement of the subject's right eye away from the nose (abduction) and left eye toward the nose (adduction). Laevoversion id adduction of the right eye and abduction of the left. Elevation of both eyes is called supraversion and depression infraversion.

Binocular vision is the use of two eyes in such a coordinated manner as to produce a unified mental percept of an object space. The cerebral cortex receives separate bundles of "encoded" image signals or "neural images" from each eye in response to separate images from slightly different perspectives cast on the separate retinae. A simple superposition of the two images would give rise to double vision and a conflicting sense of direction. The mental percept or "cotical image" is the result of the blending or fusing of the two neural images or representations in the higher levels of the brain the psychological stage of the visula process. The two monocular impressions must be brought into a corresponding association in the cortex and the brain must be capable of fusing or integrating them into a single binocular "picture." Stereopsis is thus the fusing of these "neural images" into three-dimensional percepts of an object space as a result of the slight difference in perspective between the optical images cast on the left and right retinae. It will of course be understood that there are no true pictures in the cortex.

The field of view is the extent of an object space containing all points which produce perception by way of the stationary eye, provided the stimulus is sufficient. For binocular vision to be possible, the two orbits and the structure of the eyes must be arranged so that the visual fields overlap. Happily, the orbits are positioned in front of the skull and although their axes diverge at about forty-five degrees, the eyes are nevertheless mounted in their respective orbits so that their visual axes are approximately parallel.

The monocular field of view is bounded by the superior and inferior margins of the orbit, the nose, and on the temporal side by the projection of the edge of the retina. The field of view extends to about sixty degrees nasally and one hundred degrees temporally. The overlap of the two monocular fields is the binocular field of view and may be seen by plotting each on the same chart; the area of overlap is approximately the shape of an inverted pear. The monocular temporal fields, however, contribute a great deal to spatial perception.

The field of fixation is that region of space containing all points which may be fixated by the mobile eye, the head remaining stationary. Conjugate versions over a range of about forty-five degrees from the primary position are possible. It is important to distinguish between the fields of view and fixation as the first relates to the stationary eye(s) and the second to the motor field—the solid angle within which the conjugate visual axes can be moved. In life, the visual field is effectively increased by both head and eye movements. An object in the peripheral field catches our attention and the eyes move so that the images fall on the foveae. Coordinated response of head and eye movements is required, the eye movements themselves rarely exceeding twenty degrees.

Eye movements are capable of high angular velocity, up to nine hundred degrees per second, for acquiring image information from peripheral areas to the center of vision, at the fovea, for detailed examination (saccades). Saccades may occur three or four times per second, each lasting about 20–30 ms. Successive saccades are spaced by at least 150 ms, since it takes about 50 ms to "program" the next one during a fixation, 20–30 ms to execute, 50 ms to regain clear acuity and a minimum of 50 ms to acquire a new visual scene for assessment, interpretation and integration with previous scenes. Once acquired, a target may be held at the fovea when the scene or viewer is in motion (pursuit). Clear vision may also be maintained with approaching or receding targets.

For each of the distances viewable by a normal eye between infinity and the nearest point of distinct vision there will be a corresponding state of accommodation. For binocular vision, it is necessary to consider convergence as well as accommodation since these two actions are normally associated.

Convergence is the power of directing the visual axes of the two eyes to a near point as opposed to a distant object where accommodation is at rest and the visual axes are parallel. When an observer views a near object, he is compelled both to accommodate and to converge for that distance; with a certain amount of accommodation, a corresponding effort of convergence of the visual axes is associated; the relationship between accommodation and convergence is harmonious but not unchangeable.

What is claimed is:

1. System for varying the magnification of a lens, comprising;
   an optically clear flexible solid in the form of a thin lens having a plurality of legs radiating therefrom in a same plane as said optically clear flexible solid;
   a first mount for mounting the optically clear flexible solid with ends of the legs fixed on the mount in said same plane; and
   a second mount for rotatably mounting with respect to the first mount and having rollers thereon for bearing against the plurality of legs upon rotation of the second mount with respect to the first mount for pulling the legs in said same plane and thereby stretching the optically clear flexible solid for thinning the form of the thin lens.

2. The system of claim 1, wherein the optically clear flexible solid is an ethylene-propylene-diene terpolymer vulcanizate.

3. The system of claim 1, further comprising;
   an actuator, responsive to a flex command signal, for rotating the first mount and the second mount with respect to each other thereby said stretching the optically clear flexible solid.

* * * * *